(12) United States Patent
Bujeau et al.

(10) Patent No.: US 7,875,834 B2
(45) Date of Patent: Jan. 25, 2011

(54) OVEN FOR COOKING FOOD

(75) Inventors: Robert F. Bujeau, Charbuy (FR); Michel G. Foray, Passenans (FR)

(73) Assignee: Premark FEG L.L.C., Wilmington, DE (US)

( * ) Notice: Subject to any disclaimer, the term of this patent is extended or adjusted under 35 U.S.C. 154(b) by 354 days.

(21) Appl. No.: 12/117,879

(22) Filed: May 9, 2008

(65) Prior Publication Data

US 2008/0237213 A1  Oct. 2, 2008

Related U.S. Application Data

(62) Division of application No. 10/540,347, filed as application No. PCT/EP2003/015037 on Dec. 23, 2003, now Pat. No. 7,634,992.

(51) Int. Cl.
*A21B 1/00* (2006.01)
*F24C 15/32* (2006.01)

(52) U.S. Cl. ............... 219/401; 219/400; 126/21 A; 126/21 R; 126/19 R; 126/273 R; 126/20; 126/20.1; 126/369; 374/149

(58) Field of Classification Search ............ 219/401, 219/400; 126/21 A, 21 R, 19 R, 273 R, 20, 126/20.1, 369; 374/149
See application file for complete search history.

(56) References Cited

U.S. PATENT DOCUMENTS

| | | | |
|---|---|---|---|
| 3,467,815 | A | 9/1969 | Robinson |
| 3,744,474 | A | 7/1973 | Shaw |
| 4,395,233 | A | 7/1983 | Smith et al. |
| 4,654,508 | A | 3/1987 | Logel et al. |
| 4,928,663 | A | 5/1990 | Nevin et al. |
| 5,014,679 | A | 5/1991 | Childs et al. |
| 5,148,737 | A | 9/1992 | Poulson |
| 5,460,157 | A | 10/1995 | Prabhu |
| 5,497,760 | A | 3/1996 | Alden et al. |
| 5,530,223 | A | 6/1996 | Culzoni et al. |
| 5,552,578 | A | 9/1996 | Violi |
| 5,619,983 | A | 4/1997 | Smith |
| 5,631,033 | A | 5/1997 | Kolvites |
| 5,768,982 | A | 6/1998 | Raymond et al. |
| 6,070,517 | A | 6/2000 | Helm |
| 6,175,100 | B1 | 1/2001 | Creamer et al. |

FOREIGN PATENT DOCUMENTS

CN 2163600 Y 5/1994

(Continued)

OTHER PUBLICATIONS

PCT International Search Report; Mailed May 8, 2004; PCT/EP 03/15037; filed Dec. 23, 2003; 8 pages.

*Primary Examiner*—Shawntina Fuqua
(74) *Attorney, Agent, or Firm*—Thompson Hine LLP

(57) ABSTRACT

An oven for cooking food, the oven comprising:
- an enclosure (2) for receiving the food to be heated and for containing a cooking atmosphere, the enclosure (2) comprising two horizontal walls forming respectively a bottom wall (9) and a top wall (10), interconnected by at least two vertical side walls (7, 8), the enclosure (2) being closed by at least one door (5) that is likewise vertical, and communicating with the outside via an exhaust opening (28) for exhausting gas inside the enclosure (2) and at a pressure above atmospheric pressure; and
- a heater device (11) for heating the cooking atmosphere.

16 Claims, 14 Drawing Sheets

FOREIGN PATENT DOCUMENTS

| | | |
|---|---|---|
| DE | 3643354 | 6/1988 |
| DE | 3808716 | 9/1989 |
| DE | 4131748 | 3/1993 |
| DE | 19955820 | 6/2001 |
| EP | 0388751 | 9/1990 |
| EP | 0523489 | 1/1993 |
| EP | 0652405 | 5/1995 |
| EP | 0656174 | 6/1995 |
| EP | 0691513 | 1/1996 |
| EP | 0733862 | 9/1996 |
| EP | 0737023 | 10/1996 |
| EP | 0801271 | 10/1997 |
| EP | 1107650 | 6/2001 |
| FR | 2474654 | 7/1981 |
| FR | 2660418 | 10/1991 |
| GB | 2096454 | 10/1982 |
| JP | 60-141226 A | 7/1985 |
| WO | WO 03/023285 | 3/2003 |
| WO | WO 2005/002392 | 1/2010 |

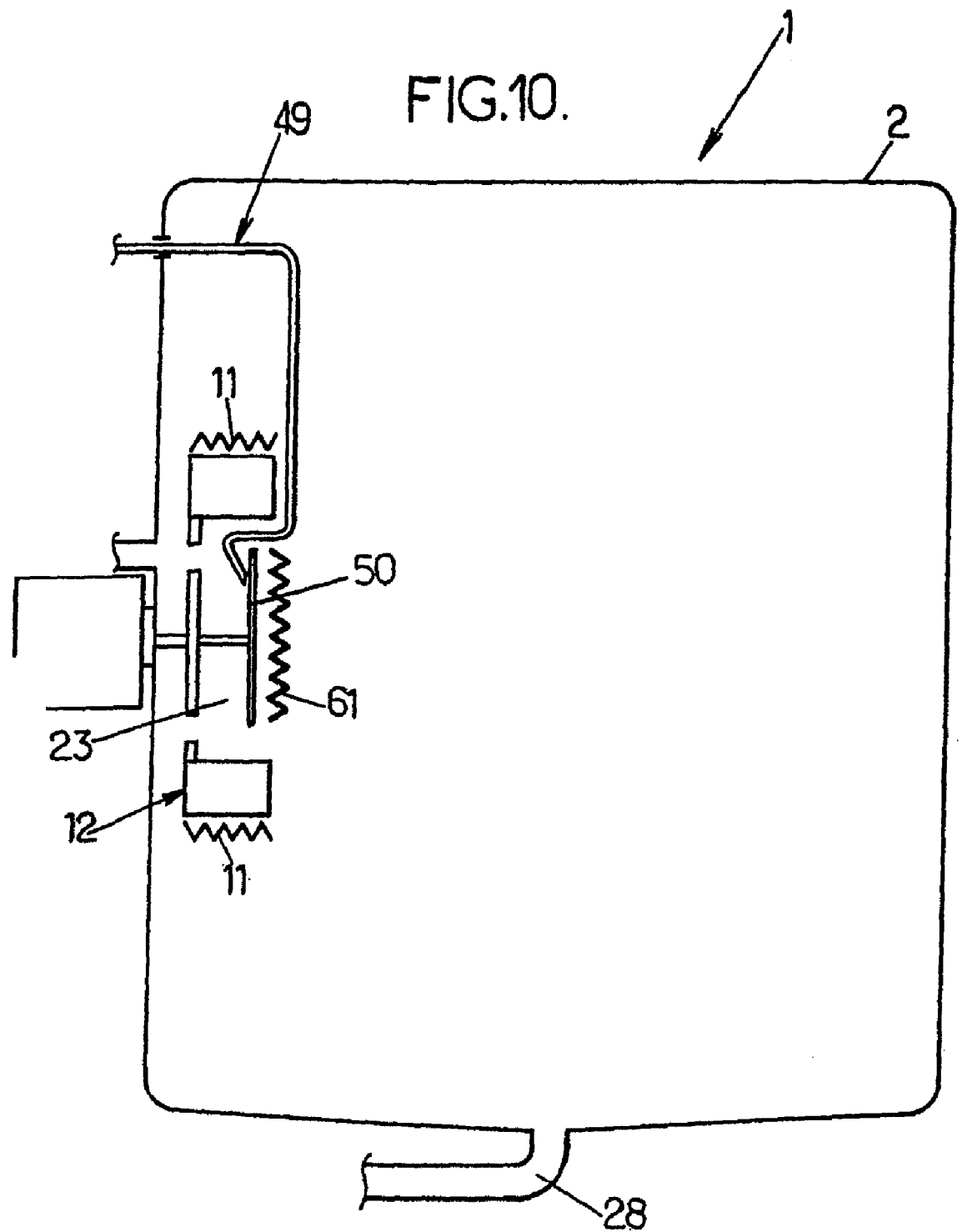

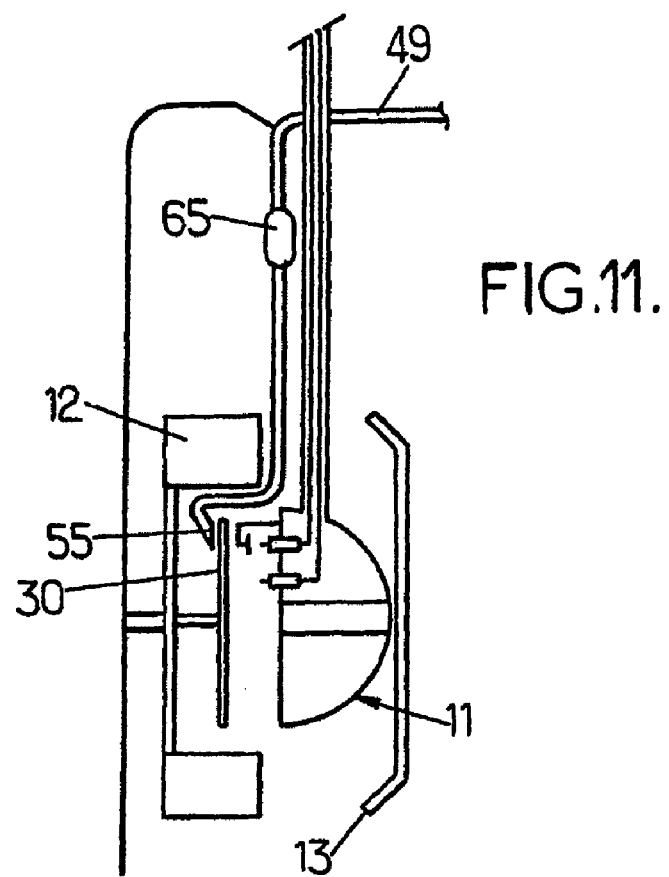

FIG.18.
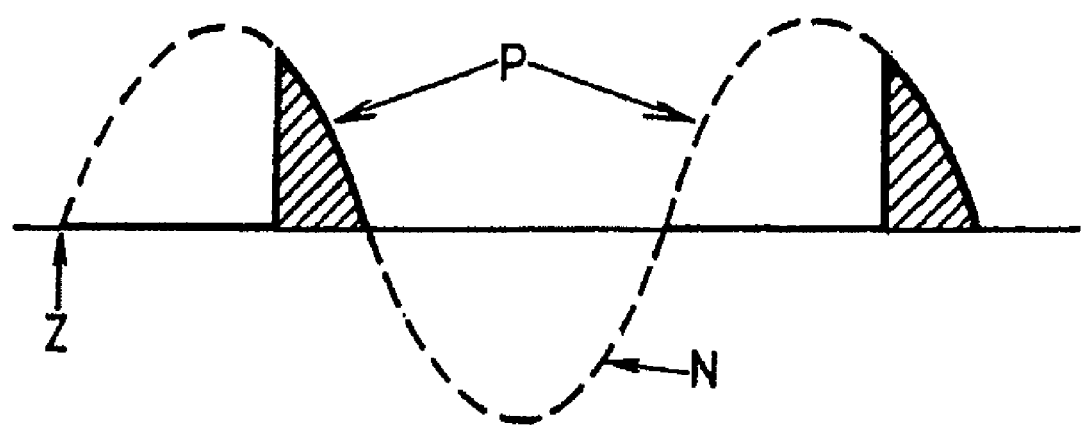
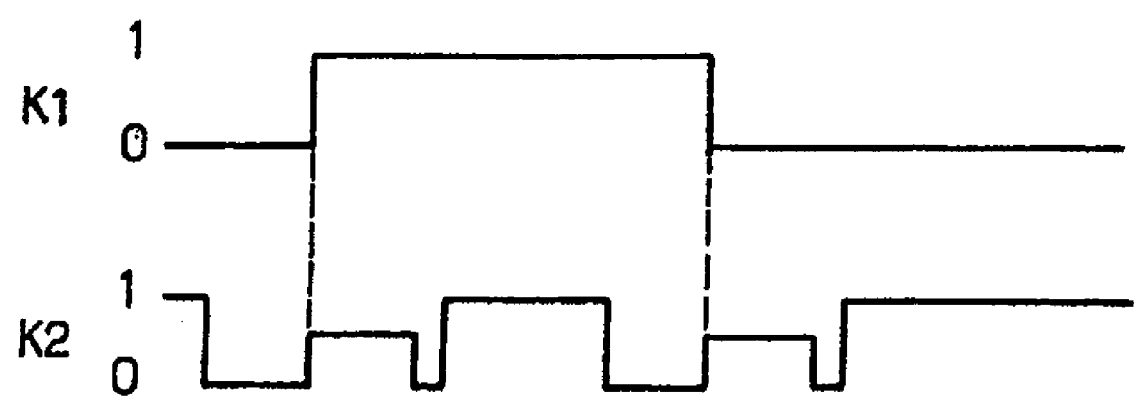
FIG.19.

OVEN FOR COOKING FOOD

CROSS-REFERENCE TO RELATED APPLICATIONS

This application is a divisional of U.S. application Ser. No. 10/540,347, filed Jun. 21, 2005, which was a national phase filing of PCT/EP03/15037, filed Dec. 23, 2003.

The present invention relates to ovens for cooking food.

More particularly, the invention relates to an oven comprising:
an enclosure for receiving the food to be heated and for containing a cooking atmosphere, the enclosure comprising two horizontal walls forming respectively a bottom wall and a top wall, interconnected by at least two vertical side walls, the enclosure being closed by at least one door that is likewise vertical, and
a heater device for heating the cooking atmosphere.

One aim of the invention is to improve this kind of ovens.

According to an embodiment of the invention, is an oven for cooking food, comprising:
an enclosure for receiving the food to be heated and for containing a cooking atmosphere, the enclosure comprising two horizontal walls forming respectively a bottom wall and a top wall, interconnected by at least two vertical side walls, the enclosure being closed by at least one door that is likewise vertical, and communicating with the outside via an exhaust opening for exhausting gas inside the enclosure and at a pressure above atmospheric pressure; and
a heater device for heating the cooking atmosphere;
the oven being characterized by the fact that it comprises:
a regulation chamber, filled at least in part with a liquid of volume adapted to vary between a high level and a low level, the regulation chamber communicating with the enclosure via an air inlet; and
an admission duct which extends between a high end and a low end, the high end opening out outside the regulation chamber and the enclosure, and the low end being closed by the liquid when the level of the liquid corresponds substantially to its high level.

Prior art ovens are known in which pressure inside the enclosure can rise, for example when vapour is produced or when the door is closed or when the heater device is a gas burner (production of combustion gases or extra pressure on lighting), and this rise in pressure can be of greater or lesser magnitude and can exist for a greater or lesser length of time. For obvious safety reasons, such pressure rises need to be governed, kept down, and even eliminated. In prior art ovens, this is generally done by means of an opening provided with a mechanical flap.

That type of flap needs regular maintenance since otherwise it runs the risk of no longer operating properly, particularly when it becomes clogged. Its safety function is then no longer performed in a manner that is effective and reliable.

That drawback is mitigated by the embodiment of the invention above defined.

Indeed, it enables pressure rises in the enclosure to be governed:
in a manner that is not mechanical, thus making it possible to overcome constraints associated with the maintenance required by prior art ovens;
in a manner which is adjustable since it is possible to stop gas coming from the enclosure or to allow it to pass to a greater or lesser extent by modifying the level of the liquid; and
in a manner that is reliable since with a liquid there is no danger of unwanted closure or mechanical blocking, and even if the bottom end of the admission duct dips below the high level of the water, should the pressure rise excessively, then the gas can push back the water, "bubble through", and escape via the admission duct.

Recourse may optionally also be had to one or more of the following dispositions:
the oven includes an evacuation chamber filled at least in part with a liquid of volume that is adapted to vary between a high level and a low level, said evacuation chamber communicating with the regulation chamber;
the oven includes an evacuation tube extending between the exhaust opening and a high end opening out into the evacuation chamber above the high and low liquid levels;
the oven includes a chimney extending between a first end communicating with the outside of the evacuation chamber and a second end coming over the high level of the liquid, said second end allowing gas under positive pressure to escape from the enclosure via the evacuation tube;
the oven includes a regulator itself comprising the regulation chamber and the evacuation chamber, these two chambers constituting volumes that are separated from each other at least in part and that communicate with each other via a narrow passage adapted to allow the liquid to flow between these two chambers;
the oven includes, in the evacuation chamber, a first temperature probe for measuring the temperature of the gas coming from the exhaust opening, and in the regulation chamber, a second temperature probe for measuring the temperature of the gas coming into the enclosure via the air inlet;
the oven includes, in the evacuation chamber, a first temperature probe for measuring the temperature of the gas coming from the exhaust opening, and a second temperature probe placed below the low level of the liquid in the evacuation chamber;
the oven includes calculation means for determining the relative humidity in the oven as a function of the temperatures measured by the first and second probes;
the oven includes a fan disposed inside the enclosure to stir the cooking atmosphere heated by the heater device, said fan creating a suction zone inside the enclosure, the air inlet being situated substantially in the suction zone of the fan;
the oven includes vapour-producing means suitable for delivering water vapour into the enclosure;
the exhaust opening for exhausting gas under positive pressure inside the enclosure is situated beneath the heater device;
the exhaust opening opens out substantially in the lowest point of the bottom wall; and
the exhaust opening communicates with a siphon adapted to evacuate liquids and condensates from the enclosure while preventing cold air from rising into the enclosure.

According to another embodiment of the invention, is an oven for cooking food, comprising:
an enclosure for receiving the food to be heated and for containing a cooking atmosphere, this enclosure comprising two horizontal walls, respectively forming a bottom wall and a top wall, interconnected by at least two vertical side walls, this enclosure being closed by at least one door which is also vertical, and communicating with the outside by means of an evacuation aperture for gases under positive pressure in the enclosure.

This oven further comprises a first temperature probe to measure the temperature of the gases issuing from the evacuation aperture.

Prior art ovens are known possibly comprising means for the production of steam arranged to supply steam in the enclosure. These prior art ovens have the drawback to not allow a reliable control of the humidity in the enclosure. Particularly, these prior art ovens usually do not take into account the humidity produced by the food itself.

That drawback is mitigated by the embodiment of the invention above defined.

Indeed, thanks to these dispositions, it is possible to calculate the humidity rate in the enclosure from the temperature measured with the first probe and from pre-recorded graphs. The cooking is then adjusted to the humidity rate calculated in this way.

Recourse may optionally also he had to one or more of the following dispositions:

the oven comprises calculating means of calculating the humidity rates in the oven as a function of the temperature measured at the first probe;

the oven comprises a second temperature probe to measure a reference temperature;

the oven, wherein the humidity rates in the oven, is calculated by the calculating means as a function of the temperature measured at the first and second probes;

the oven comprises a heater for heating the cooking atmosphere;

the oven comprises a fan, located in the interior of the enclosure, to stir the cooking atmosphere heated by the heater, this fan creating an area of low pressure in the enclosure, and the oven comprises an air inlet opening in the enclosure, approximately in said low-pressure area of the fan; thanks to this disposition, it is possible to allow air to enter in the enclosure in order to dry the atmosphere in it, in particular at the end of the cooking process; it is possible, for instance, to make food more crunchy; thanks to this disposition, it is also possible to let air go into the enclosure to cool down more quickly the cooking atmosphere, if it appears necessary in a cooking cycle; this disposition also allows to stir with the fan the cool air entering into the enclosure, as soon as it flows through the air inlet; this is an advantage with regard to ovens in which the cool air enters from the top or the bottom of the enclosure and respectively cool down the top or bottom trays; thanks to this embodiment of the invention, it is then possible to reach in the enclosure a temperature more homogeneous;

the oven comprises a regulation chamber, at least partially filled with a liquid of which the volume is adjusted so as to vary between a high level and a low level, this regulation chamber communicating with the air inlet;

the oven comprises an admission duct which extends between a high end and a low end, the high end opening outside the regulation chamber and the enclosure, and the low end being covered by the liquid when the level of the liquid corresponds approximately to its high level;

the oven comprises an evacuation chamber, at least partially filled with a liquid of volume adapted to vary between the high level and the low level, this evacuation chamber communicating with the regulation chamber;

the oven comprises a regulation box, itself comprising the regulation chamber and the evacuation chamber, these two chambers constituting volumes which are at least partially separated from one another, communicating between one another by means of a passage of limited size, designed such as to allow the liquid to circulate between these chambers;

the oven comprises an evacuation tube extending between the evacuation aperture and a high end, opening into the evacuation chamber above the high and low levels of the liquid;

the oven comprises a chimney extending between a first end communicating with the outside of the evacuation chamber and a second end entering above the high level of the liquid, this second end allowing the gases under overpressure in the enclosure to escape via the evacuation tube;

the second temperature probe is located beneath the low level of the liquid in the regulation box;

the first temperature probe is located above the high level of the liquid in the evacuation chamber;

the oven comprises means for the production of steam, arranged to supply steam in the enclosure.

According to another embodiment of the invention, is an oven for cooking food, comprising:

an enclosure intended to accommodate the food to be heated and containing a cooking atmosphere, this enclosure comprising two horizontal walls, respectively forming a bottom wall and a top wall connected by at least two vertical side walls, this enclosure being closed by at least one door which is also vertical, and communicating with the outside by means of an evacuation aperture for gases under positive pressure in the enclosure, and a heater device for heating the cooking atmosphere.

Further, in this oven the evacuation aperture for gases under positive pressure in the enclosure is located beneath the heater device.

Prior art ovens are known possibly comprising an evacuation aperture to control the evacuation of gases under positive pressure in the enclosure. These gases are for instance constituted of humidity from the enclosure produced by the cooked food and/or by vapour producing means and/or by the combustion gases, when the heater device is a gas burner.

The above defined embodiment of the invention allows improving the homogeneity of the heat distribution in this kind of oven.

Indeed, with this disposition it is possible to limit, and even to cancel, the flue action from the chimney with which the evacuation aperture communicates, while allowing the gases even under a small positive pressure in the enclosure to escape freely from the enclosure, without using a valve, a vent or any other mechanical device, which can be blocked, or even without siphon. The temperature difference between the top and the bottom of the oven is reduced and the heat distribution in the enclosure is more homogeneous.

Recourse may optionally also be had to one or more of the following dispositions:

the evacuation aperture opens at the level of the point which is approximately the lowest point of the bottom wall;

the evacuation aperture communicates with a siphon arranged to evacuate liquids and condensates from the enclosure while avoiding cool air upwelling in the enclosure;

the oven comprises means for the production of steam, designed to provide steam in the enclosure;

the oven comprises a fan, located in the interior of the enclosure, to stir the cooking atmosphere heated by the heater device, this fan creating an area of low pressure in the enclosure;

the oven comprises an air inlet in the enclosure, located approximately in said area of low pressure of the fan;

the oven comprises a regulation chamber, filled at least in part by liquid of which the volume is adjusted so as to vary between a high level and a low level, this regulation chamber communicating with the air inlet;

the oven comprises an admission duct which extends between a high end and a low end, the high end opening outside the regulation chamber and the enclosure, and the low end being covered by the liquid when the level of the liquid corresponds approximately to its high level;

the oven comprises an evacuation chamber, filled at least in part by a liquid of which the volume is adjusted so as to vary between the high level and the low level, this evacuation chamber communicating with the regulation chamber;

the oven comprises the regulation chamber and the evacuation chamber, these two chambers constituting volumes which are at least partially separated from one another, communicating between one another by means of a narrow passage, adapted to allow the liquid to flow between these chambers;

the oven comprises an evacuation tube extending between the evacuation aperture and a high end, opening into the evacuation chamber above the high level of the liquid;

the oven comprises a chimney extending between a first end communicating with the outside of the evacuation chamber and a second end coming over the high level of the liquid, this second end allowing the gases under positive pressure in the enclosure to escape via the evacuation tube;

the oven comprises a first temperature probe to measure the temperature of the gases issuing from the evacuation aperture, and a second temperature probe located beneath the low level of the liquid in the evacuation chamber;

the oven comprises a first temperature probe to measure the temperature of the gases issuing from the evacuation aperture, and a second temperature probe to measure the temperature of the gases entering the enclosure via the air inlet;

the oven comprises calculating means of calculating the humidity rates in the oven as a function of the temperatures measured at the first and second probes.

According to another embodiment of the invention, is an oven for cooking food, comprising an enclosure for receiving and heating the food in a moist cooking atmosphere.

This oven further comprises:

a water column, containing a predetermined volume of water and maintained constant between a maximum level and a low outlet through which the water flows in the column, and a diffuser designed to receive the water flowing from the low outlet and to vaporize at least part of this water.

Prior art ovens are known possibly comprising means for the production of steam, in which water is poured on a heating element. It is usually wished to have a constant production of steam. The quantity of produced steam is essentially determined by the water flow rate reaching the heating element. But, flow rate regulators used for this function are not always reliable and need to be adjusted.

That drawback is mitigated by the embodiment above defined.

Indeed, thanks to these dispositions, the water flow rate is essentially determined at the low outlet of the column by the water height in the column between the maximum level, corresponding for example to an overflow, and the low outlet. This water height can easily be maintained constant, without any particular adjustment. Further, when the pressure in the enclosure increases, for instance because of a steam production larger than its suppression, the water flow rate automatically decreases, without any feed back control means of the electronic type. This embodiment of the invention provides a simple and reliable means for a constant production of steam.

Recourse may optionally also be had to one or more of the following dispositions:

the maximum level corresponds to an overflow outlet;

the water column is located outside the enclosure and the diffuser is located in the enclosure;

the diffuser is an electric heating device; it is the case in particular when, for instance, the water is vaporized by a heating resistor;

the diffuser is heated by the heat produced by a gas burner;

the diffuser rotates about a rotation axis of a fan designed to stir, inside the enclosure, the steam produced by the diffuser, this fan creating an area of low pressure in the enclosure;

the diffuser is a disk rotating about the rotation axis;

the oven comprises an air inlet in the enclosure, located approximately in the area of low pressure of the fan;

the oven comprises a regulation chamber, communicating with the air inlet of the enclosure, filled at least in part with water deriving from an overflow of the column, the volume of which is adjusted so as to vary between a high level and a low level;

the oven comprises an admission duct which extends between a high end and a low end, the high end opening outside the regulation chamber and the enclosure, and the low end being covered by water, when the level of the water corresponds approximately to its high level;

the oven comprises an evacuation chamber, filled at least in part with water deriving from an overflow of the column, the volume of which is adjusted so as to vary between the high level and the low level, this evacuation chamber communicating with the regulation chamber;

the oven comprises an evacuation tube extending between the enclosure, with which it communicates, and a high end opening into the evacuation chamber above the high level of the water;

the oven comprises a chimney extending between a first end communicating with the outside of the evacuation chamber and a second end entering above the high level of the water, this second end allowing the gas under overpressure in the enclosure to escape via the evacuation tube;

the oven comprises a regulation box, itself comprising the regulation chamber and the evacuation chamber, these two chambers constituting volumes which are at least partially separated from one another, communicating between one another by means of a narrow passage, designed such as to allow the liquid to circulate between these chambers;

the oven comprises, between the maximum level of water in the column and the low outlet, a cooling circuit extending to the level of at least a part of the roof, in such a way as to cool the latter at least partially, and to favour the condensation above the food of at least a part of the water vapour contained in the moist atmosphere of the enclosure; and the maximum level and the low outlet feature a difference in height corresponding to a water pressure at the low outlet of between 5 and 30 mbar.

According to another embodiment of the invention, is an oven for cooking food, comprising:

an enclosure for receiving and heating the food in a moist cooking atmosphere, this enclosure comprising a top wall arranged above the food which is to be heated, a heater device arranged in the interior of the enclosure, and a fan, likewise arranged inside the enclosure, this fan comprising at least one rotating blade, rotating about a rotation axis on a circular trajectory in order to stir the cooking atmosphere heated by the heater device.

This oven further comprises:

a diffuser disk, located in the enclosure, rotating on the rotation axis integrally with the fan, and a water supply, conducting water from the outside of the enclosure to the vicinity of the diffuser disk, in such a way that the water falls onto the diffuser disk and is at least in part evaporated thanks to the heat produced by the heater device.

Prior art ovens are known which are provided with a boiler as a steam generator, this boiler being usually situated outside the enclosure. The steam arrives in the enclosure by a hole. The fan distributes the steam in the enclosure.

This kind of prior art ovens is quite expensive. That drawback is mitigated by the embodiment above defined. Indeed, this disposition is simple and does not require an additional boiler.

Recourse may optionally also be had to one or more of the following dispositions:

the diffuser disk is located in the central space located inside the circular trajectory;

the heater is arranged opposite the diffuser disk and heats it, in order to evaporate at least a part of the water which is falling onto it;

the heater is a gas burner;

the water supply comprises a water column, containing a predetermined volume of water which is maintained constant between a maximum level and a low outlet through which the water flows onto the diffuser disk; and the diffuser disk rotates at a speed of rotation adjusted such that the water falling onto it is at least in part projected onto the roof.

According to another embodiment of the invention is an oven for cooking food, comprising:

an enclosure for receiving the food to be heated, this enclosure comprising two horizontal walls, respectively forming a bottom wall and a top wall, connected by at least two vertical side walls, this enclosure being closed by at least one door which is also vertical, and a fan arranged in the interior of the enclosure comprising at least one rotating blade, rotating about a rotation axis on a circular trajectory.

This oven further comprises:

a feed system for detergent, conducting the detergent from outside the enclosure to the vicinity of the fan in such a way that some detergent falls onto the fan and is projected by the latter onto each of the walls of the enclosure.

Prior art ovens are known possibly comprising a feed system for detergent mounted on one of the vertical or horizontal walls of the enclosure. Usually, this feed system is provided on the top wall. But, this type of prior art disposition does not allow projecting the detergent on all the wall surface of the enclosure.

That drawback is mitigated by the embodiment above defined.

Indeed, thanks to this disposition of the invention, it is possible to project detergent on all the wall surface of the enclosure because the fan atomizes the detergent and the atomized detergent is drawn by the air flow everywhere in the enclosure.

Recourse may optionally also be had to one or more of the following dispositions:

the oven comprises a diffuser rotating with the fan about the rotation axis, the feed system for the detergent conducting detergent to the diffuser, in such a way that the diffuser, rotating, projects detergent in the direction of the walls of the enclosure;

the diffuser is a disk of which the axis of circular symmetry coincides with the rotation axis of the fan;

the feed system for the detergent conducts detergent into a diffuser consisting of a cylinder having a cylindrical wall with a cylindrical axis of symmetry coinciding with the rotation axis of the fan, this wall being pierced by orifices designed to allow detergent to pass radially to the outside of the cylinder, to the walls of the enclosure;

the feed system for the detergent comprises a receptacle designed for receiving detergent in such a way that some detergent is diluted with a liquid supplied above the receptacle and liquid in which the detergent is diluted flows downstream of the receptacle in the feed system for the detergent.

According to another embodiment of the invention, is an oven for cooking food, comprising:

an enclosure for receiving and heating the food in a moist cooking atmosphere, this enclosure comprising a top wall arranged above the food to be heated, and means to generate steam in the interior of the enclosure.

This oven further comprises means of cooling the top wall.

Prior art ovens are known possibly comprising a boiler for production of steam, this boiler being usually placed outside of the enclosure. The steam arises in the enclosure through a hole. The oven draws the steam in the enclosure. But it is frequently observed that even in that case, food such sauces or creams, for instance, shows at the end of the cooking a dried surface or a skin the appearance of which is not suitable.

That drawback is mitigated by the embodiment above defined.

Indeed, thanks to this disposition, the steam produced by the means to generate steam condenses on the top wall and droplets fall in the dishes or greases lying under the top wall.

This disposition allows enough to humidify the surface of the food in order to mitigate the above mentioned drawbacks.

Recourse may optionally also be had to one or more of the following dispositions:

the means of cooling consist of a circuit in which a liquid circulates, this circuit being in thermal contact with the top wall;

the liquid is water, which flows, downstream of the circuit, through a low outlet onto a diffuser intended to produce vapour in the enclosure;

a water column located upstream of the circuit and containing a predetermined volume of water maintained constant between the low outlet and a maximum level;

a water column located downstream of the circuit and containing a predetermined volume of water maintained constant between the low outlet and a maximum level.

According to another embodiment of the invention, is an oven for cooking food, comprising:

an enclosure for receiving and heating the food in a cooking atmosphere, this enclosure including two horizontal walls forming, respectively, a bottom wall and a top wall that are connected by at least two lateral vertical walls and this enclosure being closed by at least one door;

a fan, arranged inside the enclosure on one of the walls of this enclosure, this fan including at least one blade rotating about a rotation axis on a circular trajectory in order to stir the cooking atmosphere; and an air inlet opening out substantially behind the fan, on the wall of the enclosure on which the fan is mounted.

Further, in this oven each blade is connected to the rotation axis in a suitable manner so that the air from the air inlet penetrates directly inside the circular trajectory of each blade before being expelled into the remainder of the volume of the enclosure.

Prior art ovens are known, for instance by the EP-A-733 862 European Patent document, possibly comprising an enclosure, a fan arranged inside the enclosure and an air inlet opening out substantially behind the fan. But, in these prior art ovens, the temperature distribution in the enclosure is not optimised.

That drawback is mitigated by the embodiment above defined. Indeed, thanks to its dispositions, the air from the outside of the enclosure come in the enclosure, from behind the fan, to be directly and immediately stired by the fan. A more homogeneous temperature distribution is thus obtained in the enclosure.

Recourse may optionally also be had to one or more of defined dispositions:

the blades are connected to the rotation axis by a disk that includes at least one hole, located on a circular trajectory, the radius of which is substantially equal to the distance separating, on the wall of the enclosure on which the fan is mounted, the rotation axis and the air inlet;

the openings corresponding respectively to the air inlet and to each hole are substantially circular and have identical diameters;

the holes have a diameter substantially equal to 30 mm;

the blades consist of planar rectangular lamellae extending in a plane substantially perpendicular to the disk and passing through the rotation axis, and each lamella is connected to the disk by a first edge and by a second edge opposite said first edge to a circular ring centred on the rotation axis and extending in a plane parallel to the disk; and the disk includes six holes regularly distributed angularly about the rotation axis.

According to another embodiment of the invention is an oven for cooking food, comprising:

an enclosure for receiving the food to be heated, this enclosure having two horizontal walls, one forming a bottom wall and the other forming a top wall, connected by at least two vertical side walls, this enclosure being closed by at least one door, also vertical and comprising a window to give the possibility of seeing into the enclosure, and means generating an acoustic signal to indicate the end of a heating process.

This oven further comprises illuminating means designed to produce, within the enclosure, light characteristic of the end of the heating process when said heating process is finished.

Prior art ovens are known which are used for instance as institutional food service ovens. In institutional food service kitchens, it is often that several ovens are working at almost the same time. That prior art ovens are often designed in order to indicate, by means of a sound, the completion of a pre-programmed cooking. The sound is an acoustic signal which can be emitted at the end of the heating process as well as at the end at a predetermined time period or when a predetermined temperature or humidity rate is reached, etc. But, when several prior art ovens are working in a kitchen, it may have difficult to determine from which one the sound originates.

That drawback is mitigated by the embodiment above defined. Indeed, thanks to these dispositions, an user can be warned of the end of the heating process by an acoustic signal. Consequently, he is free from the task consisting in watching over the cooking process. He can go about to ones business. Nevertheless, when the completion of the cooking process for which he wants to be aware occurs, the acoustic signal draws its attention and the light which is distinctive of the oven in which this end just occurs, provide him visual signal, visible through a window in the oven door, in order to help him in spotting easily this oven.

Recourse may optionally also be had to one or more of the following dispositions:

the characteristic light is a coloured light;

the intensity of the light varies back and forth when the said heating process is over;

the illuminating means are mounted on the door;

the door has an insulating space at least partially thermally insulated from the enclosure and in which the illuminating means are mounted in the insulating space;

the insulating space comprises two glazed panels, an inner panel and an outer panel, the outer panel having a transparent region facing a transparent region of the inner panel, to form the said window, and these two panels being housed in a surround in which the illuminating means are mounted;

the back and forth variation in the intensity of the light consists in a flashing;

the oven comprises slideways for arranging trays superposed heightwise in the oven and in which the illuminating means are spread out heightwise; and the inner panel forms, facing the enclosure, a smooth wall.

According to another embodiment of the invention is an oven for cooking food, comprising an enclosure for receiving and heating food, containing a cooking atmosphere and this oven comprising:

a fan to stir the cooking atmosphere, an electric motor for driving the fan in rotation alternatively clockwise and anti-clockwise, this motor incorporating a main winding, and first switching means adapted for reversing the direction of rotation of the electric motor.

This type of oven is particularly known from U.S. Pat. No. 4,671,250 and EP A 1 107 650.

Most particularly, the document EP A 1 107 650 discloses an example of such an oven, in which the electric motor is supplied with D.C. current and the first switching means make it possible to reverse the direction of current into the motor. By reversing the direction of current feeding the motor, the direction of rotation of the turbine is reversed.

With a view of distributing the heat in the best possible way in the ovens for cooking food, it is rather frequently a common practice to reverse the direction of rotation of the fan (every other or fourth minute or so). While the direction is being reversed, the heating process must be interrupted in order to prevent the heat from building up at the top of the enclosure. The fact of reversing this rotation will slow down the cooking process and it will be desirable to change the direction of rotation of the fan as quickly as possible.

However, in this type of oven, the reversal of the direction of rotation is thwarted by the inertia of the fan and the low torque of the motors mounted in these ovens. For lack of a braking system, it takes the whole unit, i.e including the motor and the fan, a long time to stop and start again in the opposite direction. Although motors equipped with electromagnetic brakes are already available on the market, they are costly and require a high level of maintenance owing to the wear of the brake shoes.

That drawback is mitigated by an oven, wherein, in addition to the aforesaid features:
- the main winding is supplied with a source of electrical alternating current having a determined period, and
- it further comprises second switching means adapted to disconnect the main winding from the alternating current source, during a braking phase, in the course of at least part of at least one of the two alternations of each period of the electrical alternating current.

Thanks to these measures, the main winding is supplied with a rectified current that will slow down the motor. The motor is then stopped more quickly prior to the rotation reversal thereof.

Recourse may optionally be had to one or more of the following dispositions:
- the second switching means are adapted to disconnect the main winding from the source of alternating current, during the braking phase, in the course of the positive alternations or of the negative alternations of the electrical alternating current;
- the second switching means are adapted to disconnect the main winding from the source of alternating current, during the braking phase, in the course of the negative alternations and part of the positive alternations of the electrical alternating current or in the course of the positive alternations and part of the negative alternations of the electrical alternating current; in this way, the power required for the motor braking can thus be graduated;
- the second switching means are adapted to connect the main winding to the source of alternating current, during a driving phase, in the course of the positive alternations and at least part of the negative alternations of the electrical alternating current or in the course of the negative alternations and at least part of the positive alternations of the electrical alternating current; the speed of the motor can thus possibly be graduated during its renewed start-up in the reversed direction;
- the motor incorporates a secondary winding and the first switching means are adapted to reverse the direction of the current respectively in the main and secondary windings before the braking phase; thus, a higher braking efficiency and therefore a shorter braking time are attained; and
- the second switching means are adapted to disconnect the main winding from the source of alternating current, during a rest time immediately following the braking phase; this measure makes it possible to prevent the motor from re-starting, after a stoppage, into the same direction of rotation as before the braking phase.

According to another aspect, the invention relates to a process for controlling the cooking of food in an oven, wherein:
- the cooking atmosphere inside the oven is stirred by means of a fan driven by an electric motor with a main winding,
- with the help of first switching means, the direction of rotation of the electrical motor is reversed in order to drive the fan in rotation alternatively both in the clockwise and in the anti-clockwise direction,
- the main winding is supplied with a source of alternating current having a pre-defined period, and
- during a braking phase, the main winding is disconnected from the source of alternating current, in the course of part of at least one of the two alternations of each period of the electrical alternating current.

Recourse may optionally be had to one or more of the following dispositions:
- during the braking phase, the main winding is disconnected from the source of alternating current, in the course of the positive alternations or of the negative alternations of the electrical alternating current;
- during the braking phase, the main winding is disconnected to the source of alternating current, in the course of the negative alternations and part of the positive alternations of the electrical alternating current or in the course of the positive alternations and part of the negative alternations of the electrical alternating current;
- during a driving phase, the main winding is connected to the source of alternating current, in the course of the positive alternations and at least part of the negative alternations of the electrical alternating current or in the course of the negative alternations and at least part of the positive alternations of the electrical alternating current;
- the motor incorporates a secondary winding and the direction of the current is reversed respectively in the main winding and in a secondary winding prior to the braking phase;
- during a rest phase immediately following the braking phase, the main winding is disconnected from the source of alternating current.

Other aspects, objects, and advantages of the invention appear on reading the description of various embodiments.

The invention will also be better understood from the accompanying drawings, in which:

FIG. 10 is a diagrammatic view similar to those of FIGS. 2, 8, and 9, showing a fourth embodiment of the oven of the invention;

FIG. 11 is a diagrammatic view, analogous to FIG. 2, a part of a variant of the oven of the preceding Figures, showing a receptacle for receiving a detergent product;

FIG. 12 is a diagrammatic view, shown from the front, the detergent receptacle of FIG. 11;

FIG. 18 shows schematically a period of the current intended for feeding the primary circuits of the motors driving the oven fans shown on FIG. 16, and FIG. 19 shows a cycle of operation of the first and second switching means suited for controlling the supply of the motors driving the oven fans as shown on FIG. 16.

In the various figures, elements that are identical or similar are designated by the same references.

Four embodiments of the oven of the invention are described below with reference to FIGS. 1 to 10.

Figure 1:
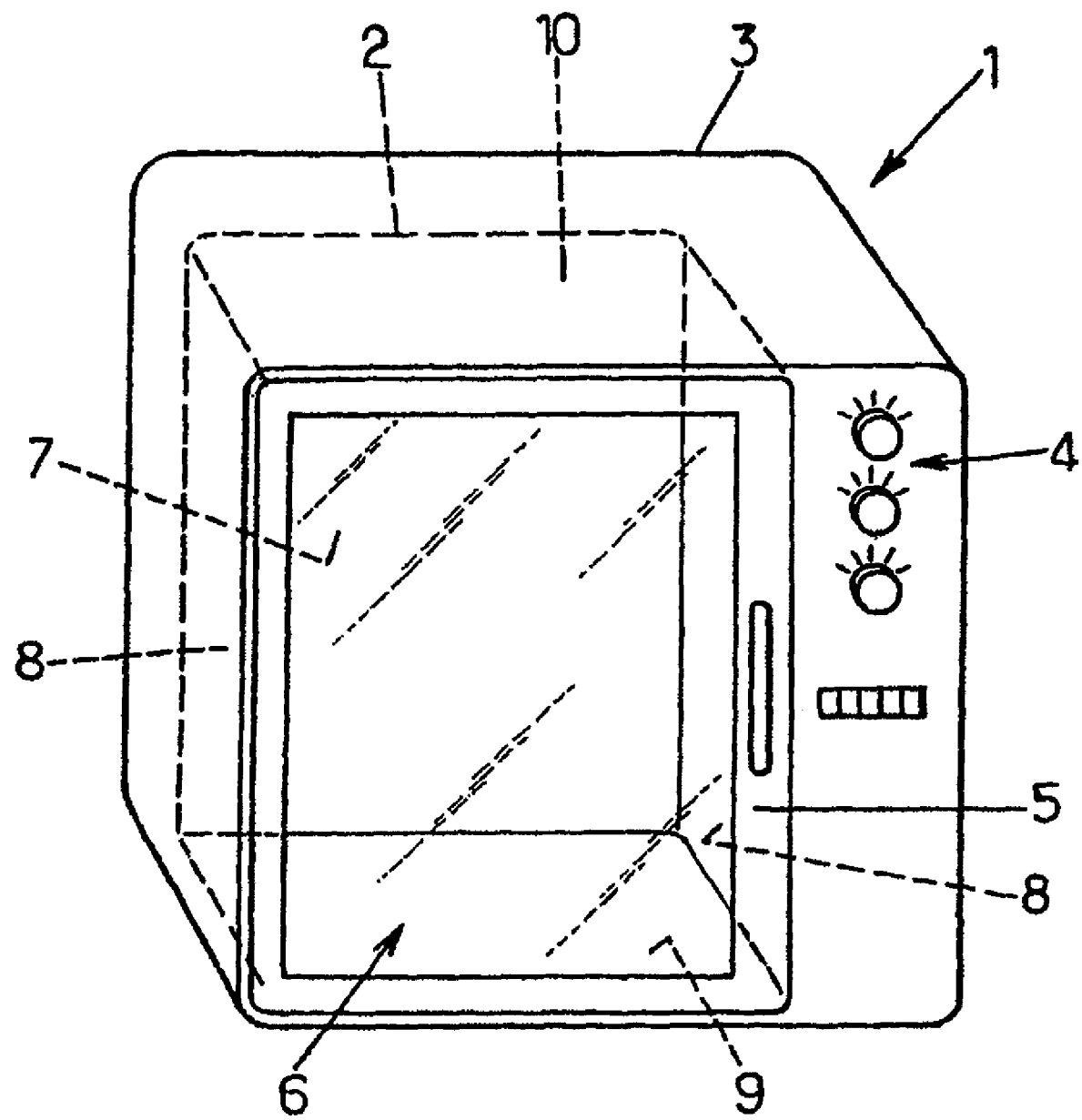
FIG. 1 is a diagrammatic perspective view of a first embodiment of the oven of the invention.

In the first embodiment, shown in FIG. 1, the oven 1 of the invention comprises an enclosure 2 (or muffle) contained in a casing 3. The casing 3 carries means 4 for regulating the temperature in the enclosure 2, and has a door 5 allowing food that is to be heated and/or cooked to be inserted into the enclosure 2.

The enclosure 2 is substantially in the form of a rectangular parallelepiped having a front face 6 that is opened or closed by the door 5, a back wall 7 opposite from the front face 6, two vertical side walls 8 between the front face 6 and the back wall 7, together with a bottom 9 and a top 10 forming two horizontal walls. All of these walls are made of sheet metal.

Figure 2:
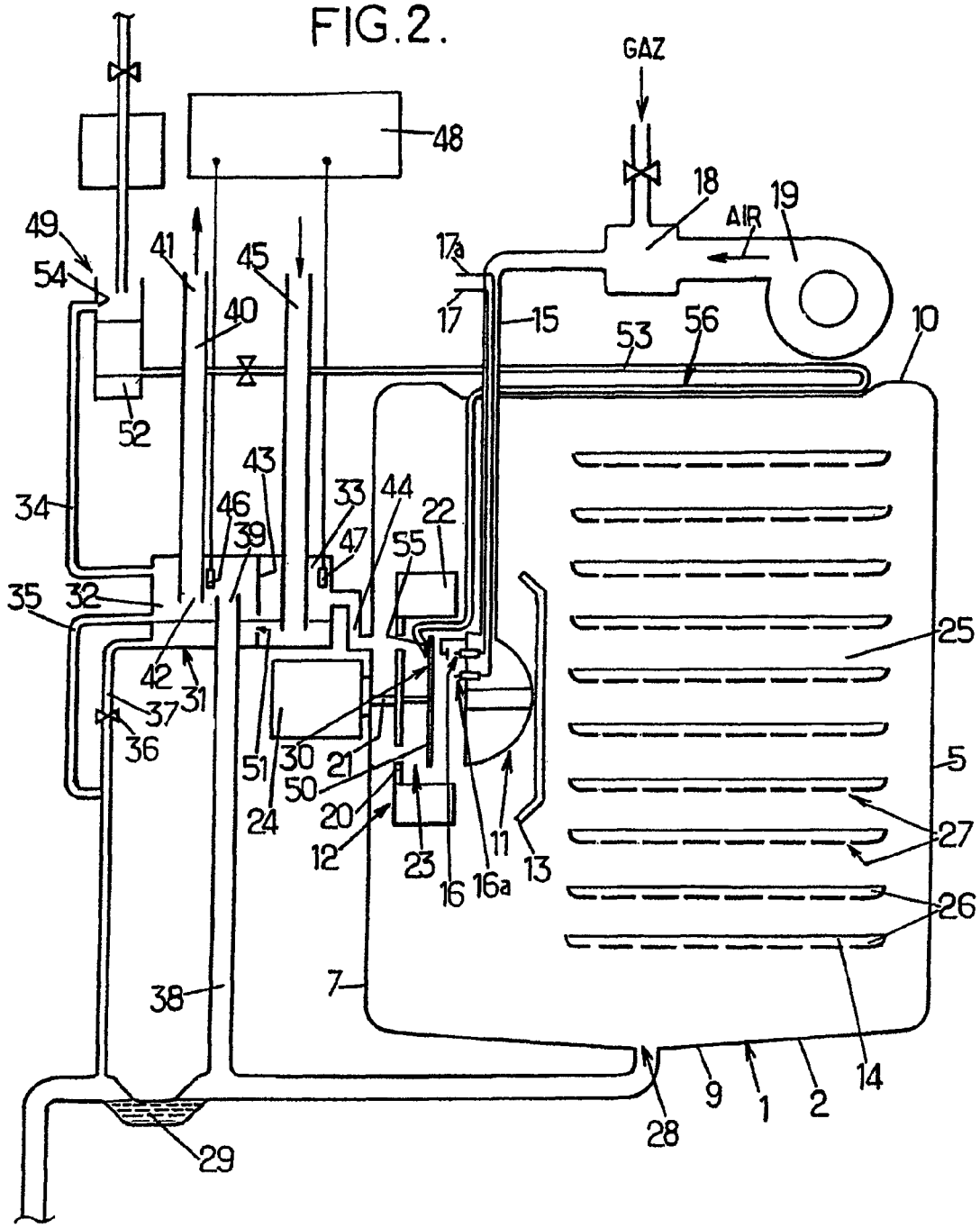
FIG. 2 is a diagram of the FIG. 1 oven in which, specifically, the enclosure of the oven is shown in section on a vertical plane perpendicular to its back wall, intercepting the back wall and the heater device substantially in the middle.

As shown in FIG. 2, the enclosure 2 also includes a heater device 11, a fan 12, a protective grid 13, and slideways 14.

The heater device 11 is placed inside the enclosure 2 facing the fan 12. In the present embodiment, it is constituted by a burner for burning gas. It is fed with gas for burning via a duct 15. The burner 11 is lit by an electrode 16 powered electrically by a wire 17 penetrating into the burner 11 via the duct 15. The burner 11 also has a flame monitor device 16a, e.g. operating by ionization, connected to a monitoring unit (not shown) by a wire 17a. The wires 17 and 17a leave the duct 15 via cable glands.

The gas for burning is advantageously a mixture of air and gas. This mixture is mixed by a mixer 18. Air is fed via a blower 19. Thus, the air/gas mixture reaches the burner 11 at a pressure slightly above atmospheric. The supply of gas for burning is governed by electronic means (not shown). In the event of the burner 11 being stopped, for example when a reference temperature is reached, a small positive pressure is maintained by the blower 19 so as to prevent any vapour rising into the mixer 18.

The fan 12 is mounted substantially in the center of the back wall 7. It is constituted by a disk 20 centered on an axis of rotation 21.

Figure 3:
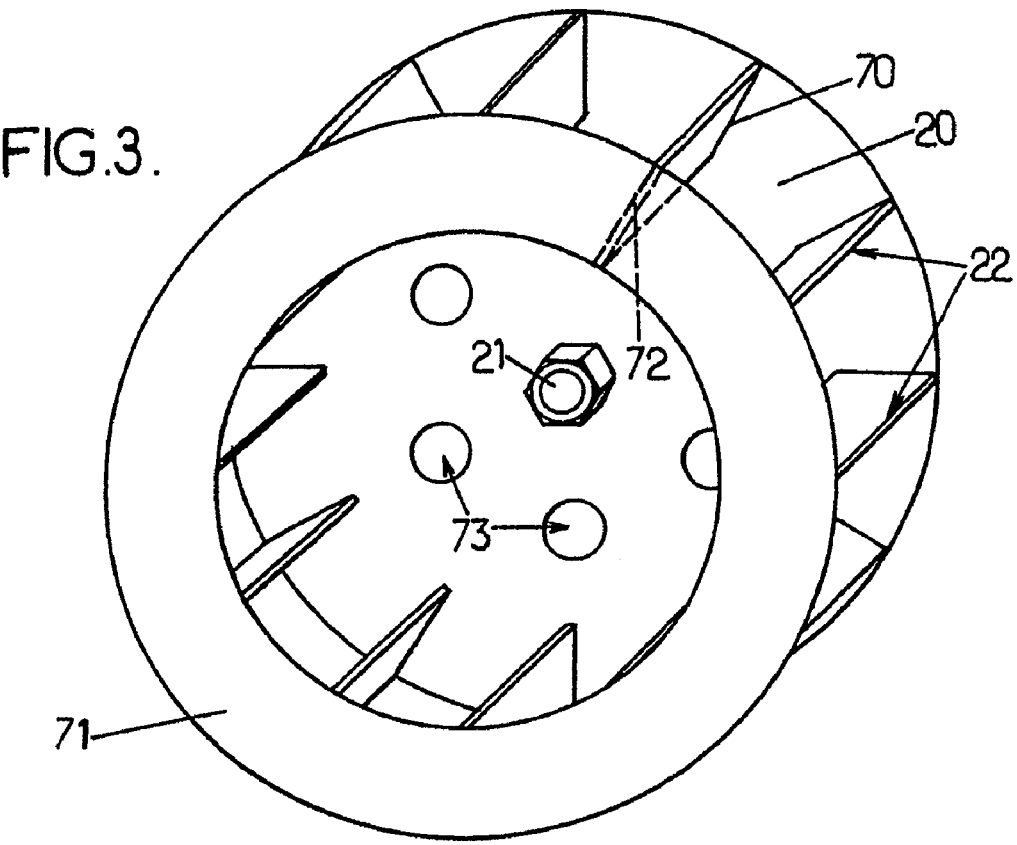
FIG. 3 is a perspective view of the fan of the oven shown in FIGS. 1 and 2.

As shown FIG. 3, at the periphery of this disk 20, the fan 12 has a plurality of blades 22 that are uniformly distributed angularly around the axis of rotation 21. By way of example, these blades 22 are constituted by plane rectangular plates each extending in a plane substantially perpendicular to the disk 20 and containing the axis of the rotation 21. This symmetry about the axis of rotation 21 enables the blades to be rotated clockwise or counterclockwise in equivalent manner.

Each blade 22 is bound, on one hand, to the disk 20 by a first edge 70 and, on the other hand, to a crown 71 by a second edge 72. The crown 71 is circular in shape, with an external diameter approximately equal to the one of the disk 20, and is centred on the axis of rotation 21. The crown 71 extends in a plane parallel to the disk 20.

Figure 4:
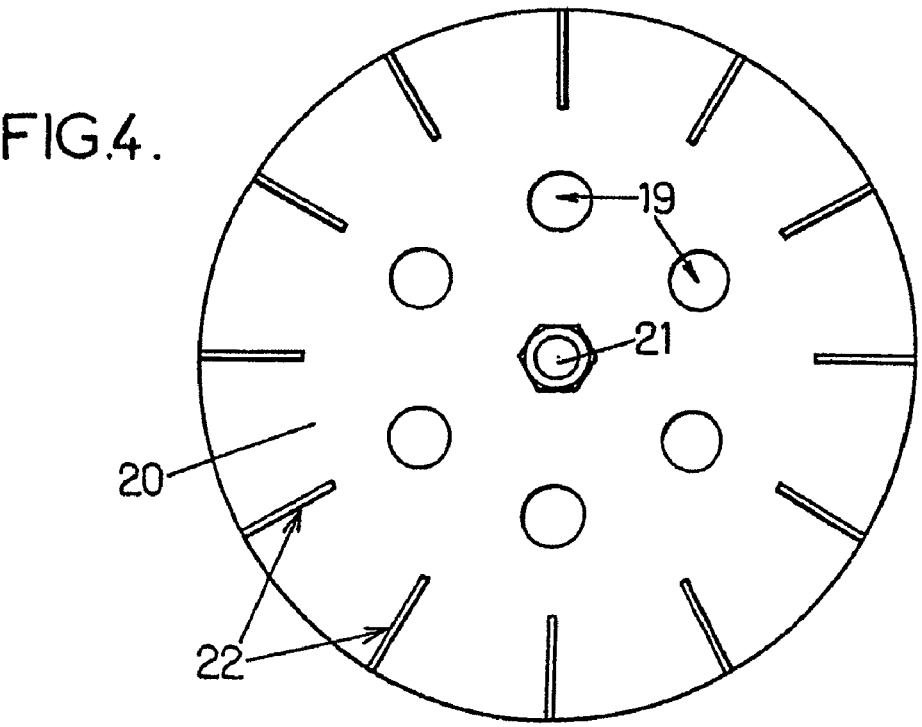
FIG. 4 is a section of the fan shown in FIG. 3.

As also shown in FIG. 4, the disk 20 is bored with holes 73. These holes 73 form approximately circular openings, regularly angularly distributed around the axis of rotation 21. According to a first example of embodiment of the fan 12, it has a 350 mm diameter; it comprises twelve blades 22 and six holes of approximately 30 mm diameter distributed on a circle of 220 mm diameter. This diameter corresponds approximately to the distance, on the back wall 7, between the centre of the axis of rotation 21 and the air inlet 44. The blades 22 have, for instance, a dimension of 30 mm in the direction parallel to the edges 70 and 72 and a dimension of 80 mm in the direction perpendicular to the edges 70 and 72. The holes 73 are approximately on the bisector of the angular sector delimited by two successive blades 22. As an example, for an air inlet of 40 mm diameter, the holes 73 have a diameter approximately of 30 mm.

According to another example, the fan 12 differs from the one above mentioned, essentially by the fact that the disk 20 has a 270 mm diameter.

The fan 12 is rotated about the axis of rotation 21 by a motor 24, e.g. an electric motor. The direction of rotation of the fan 12 is advantageously reversed periodically. The fan 12 serves to distribute heat throughout the enclosure 2.

When they are rotating, the blades 22 follow a circular path centred on the axis of rotation 21 and defining a central space 23.

The burner 11 is placed facing the central space 23. A portion of the burner 11 optionally penetrates into the central space 23.

The protective grid 13 extends in a vertical plane facing the disk 20, in front of the burner 11 and the fan 12 as seen from the cooking space 25 for receiving the food to be heated and situated between said burner 11 and the door 5. The protective grid 13 is optional.

The slideways 14, comprising ten pairs, extend substantially horizontally on the side walls 8. Each side wall 8 carries one of the slideways 14 in each pair. These slideways 14 serve to hold trays 26 on which the food for heating and/or cooking is disposed. Advantageously, the bottoms of the trays 26 have perforations 27.

The enclosure 2 communicates with the outside via an exhaust opening 28. This exhaust opening 28 serves to allow the cooking atmosphere contained in the enclosure 2 to escape whenever said atmosphere is at a pressure that is higher than the pressure outside the enclosure 2. This exhaust opening 28 is situated below the heater device 11. More precisely, the exhaust opening 28 opens out substantially in the low point of the bottom wall 9. In the embodiment described herein, the bottom wall 9 comprises faces sloping downwards towards a point situated substantially in the middle thereof.

Condensation occurring inside the enclosure 2 flows along the sloping faces towards the exhaust opening 28, and is taken therefrom to outside the enclosure 2. For this purpose, the exhaust opening 28 communicates with a siphon 29. When the siphon 29 is full, i.e. in its normal condition of use, the liquid contained in the bottom of the siphon 29 prevents cold air from rising into the exhaust opening 28, and thus into the enclosure 2, thereby contributing to obtaining a temperature inside the enclosure 2 that is stable and uniform by avoiding introducing cold air through the exhaust opening 28.

Condensation may come from food that is being cooked in the enclosure 2 and/or from vapour-producing means 30 suitable for delivering water vapour into the enclosure 2.

In a variant of the present embodiment (not shown), the exhaust opening 28 may open out through one of the side walls 8 and/or through the back wall 7 of the enclosure 2.

Under such circumstances, condensation is removed by other means. In yet another variant, the exhaust opening 28 is situated at the junction between the bottom wall 9 and one of the side walls 8 or the back wall 7.

In the embodiment of the invention described herein, the oven 1 has a regulator 31. The regulator 31 comprises an evacuation chamber 32 and a regulation chamber 33. The evacuation chamber 32 and the regulation chamber 33 communicate with each other via a narrow passage 51.

The regulator 31 is situated inside the casing 3 behind the back wall 7 with which it communicates via an air inlet 44.

The regulator 31 is partially filled with water by means of a water feed 34. The water level in the regulator 31 is controlled by a first overflow 35 which flows into the siphon 29. Thus, even when condensation is not sufficient to prevent air rising through the siphon 29, the siphon can be filled directly by the water feed 34 via the first overflow 35.

The water level in the regulator 31 can also be controlled by an emptying valve 36. This emptying valve 36 controls the rate at which water flows in an emptying duct 37 connecting the bottom of the regulator 31 to the siphon 29.

The volume of water in the regulator 31, and thus in the evacuation chamber 32 varies between a high level corresponding to the height of the first overflow 35, and a low level corresponding to the height of the junction between the emptying duct 37 and the regulator 31.

An evacuation tube 38 extends between the evacuation opening 28 and a high end 39 opening out into the evacuation chamber 32 above the high and low levels of water in the evacuation chamber 32. This evacuation tube 38 opens out between the evacuation opening 28 and the siphon 29.

The evacuation chamber 32 also communicates with a chimney 40. This chimney 40 extends between a first end 41 situated outside the evacuation chamber 32 and a second end 42 situated above the high water level. When the pressure inside the enclosure 2 increases, the gas contained in the enclosure 2 escapes through the evacuation opening 28 and then via the evacuation duct 38 and the chimney 40.

In the present embodiment, the regulation chamber 33 is adjacent to the evacuation chamber 32. The regulation chamber 33 and the evacuation chamber 32 are separated by a partition 43. The partition 43 does not separate the evacuation chamber 32 and the regulation chamber 33 in a completely sealed manner. This partition 43 serves to restrict, without completely preventing, exchanges of gas and water between the two enclosures 32 and 33 which take place via the narrow passage 51.

The regulation chamber 33 communicates with the enclosure 2 via the air inlet 44 opening out into the enclosure 2 substantially in a suction zone established by rotation of the fan 12. The regulation chamber 33 also communicates with the outside via an admission duct 45 which enables air to penetrate into the regulation chamber 33, providing the water level is situated beneath the admission duct 45.

However, in the event of the pressure in the enclosure 2 rising, even if the exhaust opening 28 or the evacuation tube 38 is blocked, the burnt gas can escape via the admission duct 45 regardless of the water level being anywhere between its high level and its low level in the regulation chamber 33. If the admission duct 45 dips below the level of the water in the regulation chamber 33, then the burnt gas can "bubble through" and escape. The regulation chamber 33 thus serves not only to govern humidity by allowing cold and drier air to enter via the admission duct 45, by varying the water level, but it also serves to govern pressure inside the enclosure 2, and it does this without any mechanical system for opening or closing ducts. The regulator 31 thus serves to perform functions that are analogous to those of mechanical systems, such as flaps, but it presents the advantage of not being capable of becoming clogged and blocked, thereby giving the oven of the invention a greater degree of safety.

A first temperature probe 46 is placed in the evacuation chamber 32 in order to measure the temperature of the gas coming from the exhaust opening 28 and conveyed by the evacuation tube 38. A second temperature probe 47 is placed in the regulation chamber 33 in order to measure the temperature of the gas coming into the enclosure 2 via the air inlet 44. The first probe 46 measures a temperature representative of the temperature of the enclosure 2, given that cold air from outside the enclosure 2 is prevented from rising by the siphon 29. The second probe 47 measures a temperature that is representative of the temperature of the air arriving via the admission duct 45.

The first and second temperature probes 46 and 47 are connected to calculation means 48 for determining the relative humidity inside the enclosure 2. The relative humidity inside the enclosure 2 is calculated by the calculation means 48 in conventional manner, for instance from the difference of temperature between the first 46 and second 47 probes and on the basis of prior calibration.

In the present embodiment, the oven of the invention also has vapour-producing means 30 for supplying steam (water vapour) to the enclosure 2. In the present embodiment, these vapour-producing means 30 comprise a water column 49 and a diffuser 50.

The water column 49 comprises a supply of water 52 and a tube 53.

The supply 52 is located outside the enclosure 2. It has a high outlet 54 acting as an overflow and corresponding to the highest level of water in the column 2. The tube 53 allows water to flow from the supply 52 to the diffuser 50. Water runs out of the tube 53 into the diffuser 50 via a low outlet 55.

The diffuser 50 is constituted by a disk that rotates together with the rotary shaft 21 of the fan 12. This diffuser disk 50 is situated in the central space 23 facing the burner 11. The diameter of the diffuser disk 50 is substantially equal to the diameter of the burner 11. The burner 11 thus heats the disk 50.

Water running from the column 49 to the vicinity of the disk 50 falls onto it. The disk 50 as heated by the burner then causes a portion of this water to vaporize. Another portion of the water is projected by the disk 50 and is vaporized in the flames of the burner 11. Another portion of the water which is neither vaporized on coming into contact with the disk 50 nor in the flames of the burner 11 is projected onto the walls 7,8, 9, and 10, and in particular onto the top wall 10. The water projected onto the top wall 10 can drip onto the top tray and then via the perforations 27 from tray 26 to tray 26 towards the bottom wall 9 where the water is recovered via the exhaust opening 28. This prevents the formation of a, dried and/or burnt skin on the food placed in the trays 26.

The proportion of water projected onto the top wall 10 can be controlled by varying the speed of rotation of the diffuser disk 50.

The pressure difference in the water column 49 between the maximum level and the low outlet 55 lies in the range 5 millibars (mbar) and 30 mbar. So long as the level of water in the column 49 is kept constant, this pressure difference likewise remains constant, except when the pressure increases inside the enclosure 2. So long as the pressure inside the enclosure 2 remains substantially equal to the pressure outside the enclosure 2, i.e. atmospheric pressure, then the rate at which water flows through the low outlet 55 is substantially constant. However, if vapour is produced inside the enclosure 2, then the pressure inside the enclosure 2 increases above the pressure outside the enclosure 2. The pressure difference between the maximum level and the low outlet 55 then decreases, and consequently the rate at which water flows out through the low outlet 55 also decreases. The water column 49 thus provides automatic regulation of the rate at which vapour is produced inside the enclosure 2.

The high outlet 54 communicates with the water feed 34. Water flowing via the high outlet 54 comes into the regulator 31.

Figure 5:
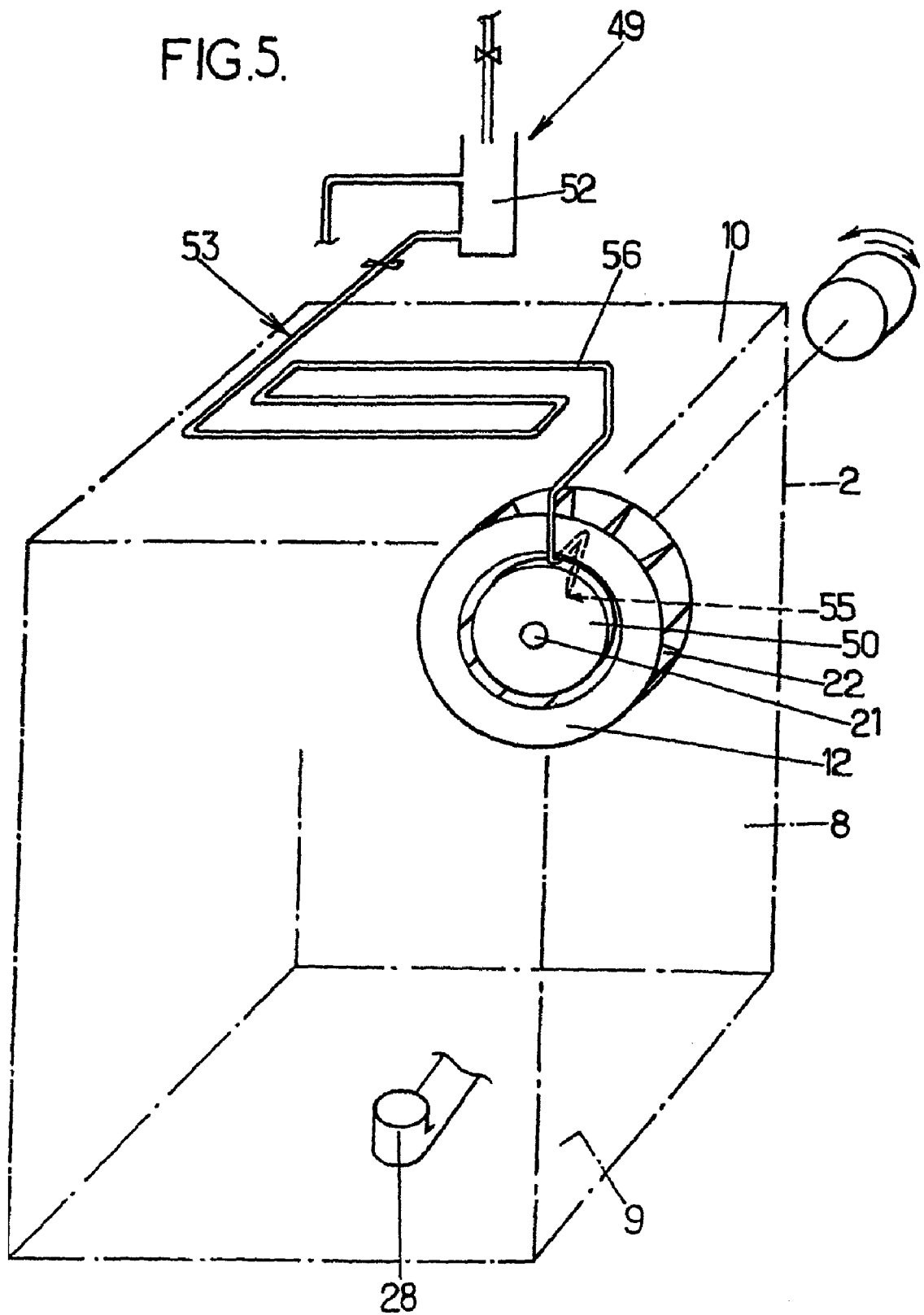
FIG. 5 is a perspective view of the circuit for cooling the top wall of the oven shown in FIGS. 1 and 2.

As shown in FIG. 5, the tube 53 has a portion between the water supply 52 and the low outlet 55 that forms a cooling circuit 56. This cooling circuit 56 forms a sinuous coil which extends outside the enclosure 2 over a portion of the top wall 10, in contact therewith. By way of example, the coil fits closely to grooves formed in the sheet metal constituting the top wall 10 during stamping thereof.

Thus, the top wall 10 is cooled which assists at least a fraction of the water vapour contained in the atmosphere inside the enclosure 2 to condense. The water that condenses on the top wall 10 can drip onto the top tray. Since the bottoms of the trays 26 have perforations 27, the water then drips from tray to tray towards the bottom wall 9, where the water is collected in the exhaust opening 28. This serves to prevent a dried-out and/or burnt skin forming on the food placed in the trays 26.

Outside periods during which the oven 1 is in use for cooking food, the water column 49 may be used to convey detergent to the vicinity of the fan 12. When detergent flows out through the low outlet 55, it falls onto the diffuser disk 50 which, by turning with the fan 12 about the axis of rotation 21, projects the detergent to the blades 22 of the fan 12 which in turn project detergent towards the walls 7, 8, 9, and 10 of the enclosure 2 and towards the door 5. Almost the entire surface of the walls 7, 8, 9, and 10 of the enclosure 2 together with the door 5 is thus covered in detergent. It is possible to optimize the distribution of detergent over the walls 7, 8, 9, and 10, and over the door 5 by causing the speed of rotation of the disk 50 and the fan 12 to vary.

Figure 6:
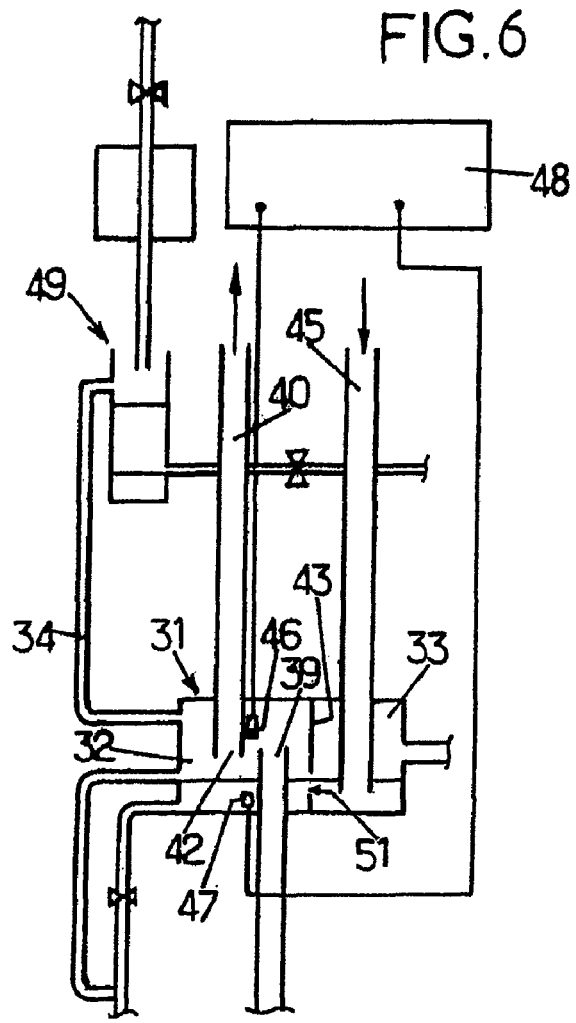
FIG. 6 is a diagram analogous to FIG. 2 showing a variant of the regulator of the oven shown in FIG. 2.

In a variant shown in FIG. 6, the first probe 46 is placed in the evacuation chamber 32 in the manner described above, but the second probe 47 is also placed in the evacuation chamber, in the water beneath the low level. Thus, the first probe 46 measures a temperature representative of the temperature inside the enclosure 2 as explained above, while the second probe 47 measures a temperature which is substantially stable and which can be used as a reference temperature for determining the relative humidity in the enclosure 2.

Figure 7:
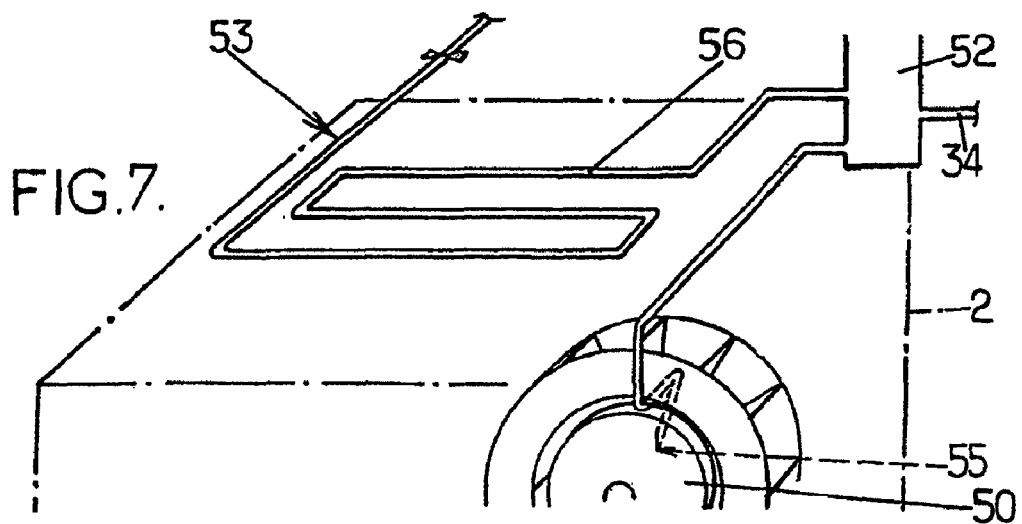
FIG. 7 is a diagram analogous to FIG. 5 showing in perspective a variant of the cooling circuit for the top wall of the oven shown in FIGS. 2 and 5.

In another variant shown in FIG. 7, the cooling circuit 56 is placed upstream from the supply of water 52.

Figure 8:
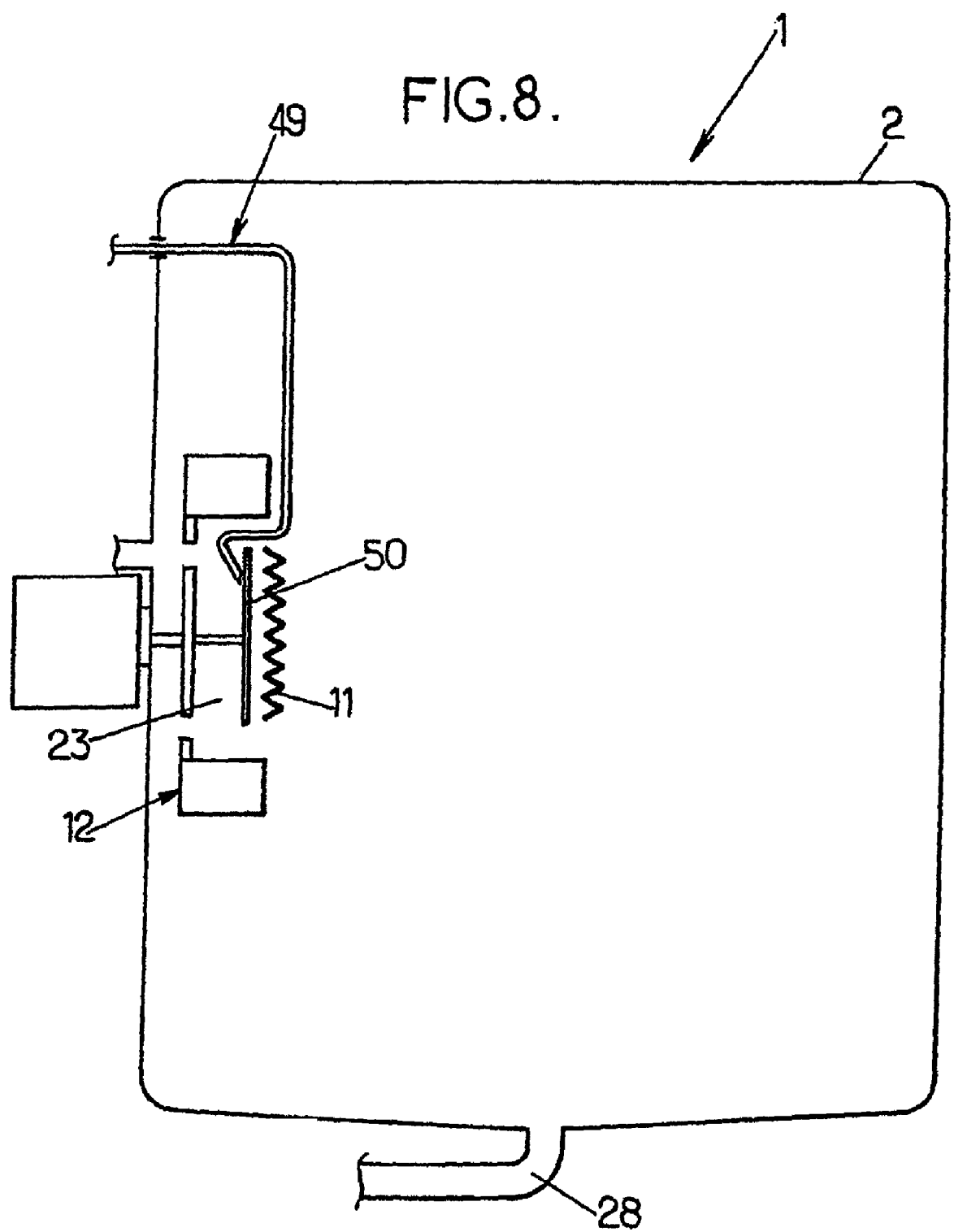
FIG. 8 is a diagrammatic view analogous to FIG. 2 showing a second embodiment of the oven of the invention.

The second embodiment of the oven 1 of the invention is shown in FIG. 8. In this embodiment, the oven 1 of the invention is analogous to that described as the first embodiment. It differs essentially by the fact that the heater device 11 is constituted by an electric resistance heater instead of a gas burner. This electric resistance heater 11 is situated substantially in the same place as the gas burner described for the preceding embodiment. The electric resistance heater 11 may be situated at least in part in the central space 23. It performs essentially the same functions as the gas burner. In particular, it heats the diffuser disk 50.

In a variant, water from the volume 49 flows directly onto the electric resistance heater. (In this case the oven 1 of the invention needs not necessarily to have a diffuser disk 50.) The steam which is then produced is sucked away and distributed within the enclosure by the fan 12.

Figure 9:
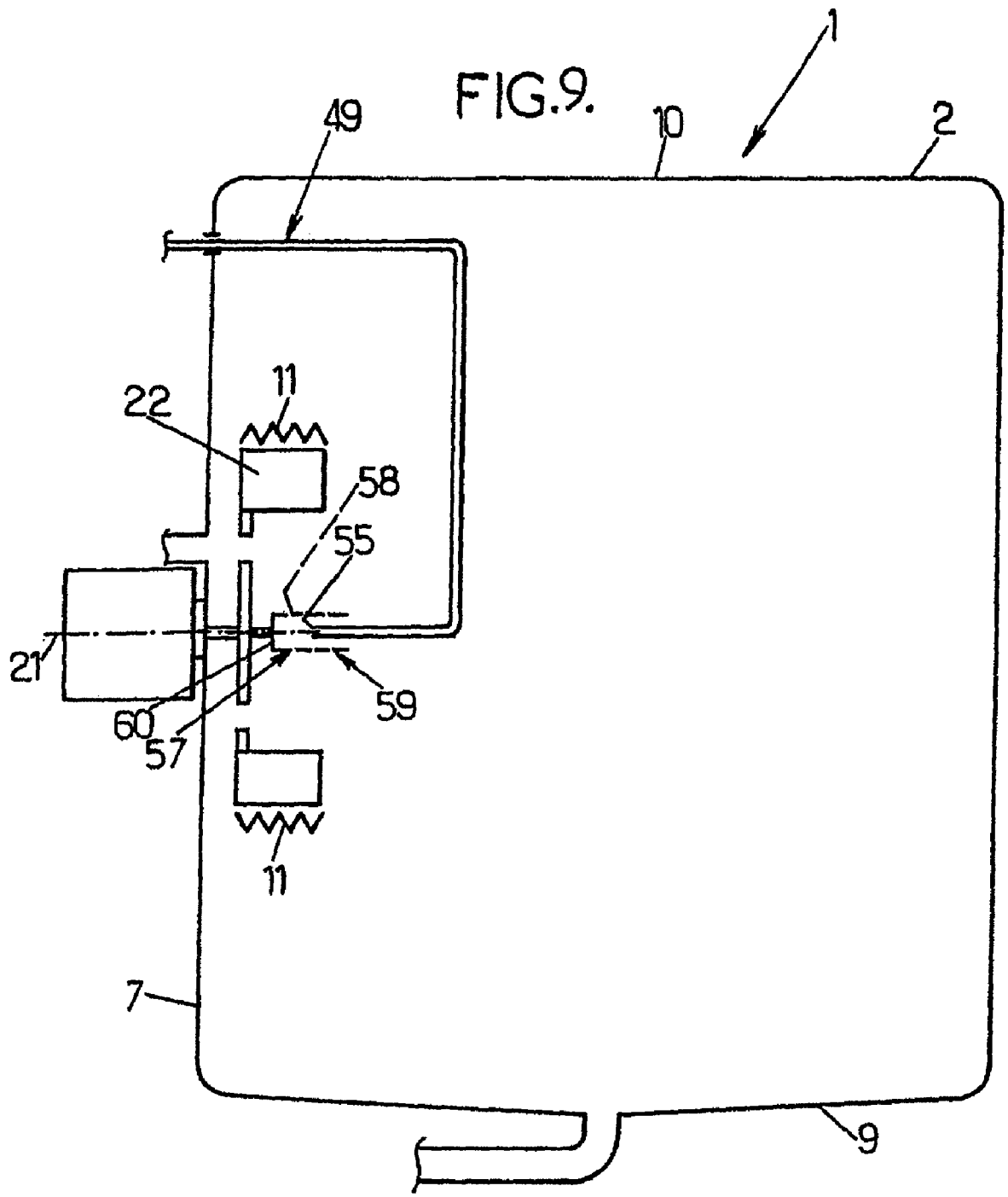
FIG. 9 is a diagrammatic view analogous to those of FIGS. 2 and 8, showing a third embodiment of the oven of the invention.

The third embodiment of the oven 1 of the invention is shown in FIG. 9. In this embodiment, the oven 1 of the invention is analogous to that described as the second embodiment. It differs essentially by the fact that the diffuser disk 50 is replaced by a diffuser cylinder 57, and the heater device 11 is constituted by an electric resistance heater placed as a ring or a crown around the fan 12.

The diffuser cylinder 57 has a cylindrical wall 58 that is circularly symmetrical about the axis of rotation 21. This wall 58 is made of metal and is pierced by holes 59. One of the two ends of the diffuser cylinder 57 is closed by a disk-shaped partition 60 extending perpendicularly to the axis of rotation 21. The partition 60 is secured to a shaft co-axial with the axis of rotation 21. It is centred on the axis of rotation 21. The diffuser cylinder 57 thus rotates together with the fan 12. The other end of the diffuser cylinder 57 is open. The low outlet 55 of the water column 49 is situated inside the diffuser cylinder 57. Thus, water flowing from the column 49 is in part sprayed by the rotating cylindrical wall 58. The sprayed water escapes via the holes 59 in the cylindrical wall 58 and also through the open end of the cylinder 57, after which it is projected towards the blades 22 of the fan 12 and towards the walls 5, 7, 8, 9, and 10 of the enclosure 2. Water reaching the top wall 10 drips onto the trays 26, thus serving to prevent food that is being cooked and/or heated in the oven 1 from drying out.

Similarly, when the oven 1 is not in use for cooking food, the water column 49 may be used to convey detergent to the vicinity of the fan. Thus, the diffuser cylinder 57 performs essentially the same functions as the diffuser disk 50 described with reference to the preceding embodiments.

The fourth embodiment of the oven 1 of the invention is shown in FIG. 10. In this embodiment, the oven 1 of the invention is analogous to that described as the second embodiment. It differs therefrom essentially by the fact that the heater device 11 is placed as a ring around the fan 12, as in the third embodiment, and additional heater means 61 are placed substantially facing the diffuser disk 50 in order to heat it. These additional heater means 61 are constituted by an electrical resistance heater, for example.

The oven of the invention can be the subject of numerous variations without going beyond the ambit of the invention.

Thus, in a variant that is not shown, the enclosure 2 has a front face and a rear face, each of which can be opened or closed by a door. Under such circumstances, a fan 12 is mounted, for example, on at least one of the side walls 8, and a heater device 11 is placed facing each fan 12.

In another variant of the invention, shown in FIGS. 11 and 12, the oven according to the invention comprises a receptacle 65 for a detergent product. More precisely, the receptacle 65 is inserted in the feed system for detergent 49, above the burner 11, the fan 12 and the protective grid 13. Water is supply to the receptacle 65 via the water column 49. The detergent product is diluted in the water and then flows at least in part, draw stream of the receptacle 65, from the receptacle to the low outlet 55.

The detergent product can be liquid as well as solid. For this latter case, the detergent product is, for instance, a tablet or a pellet of compressed powder.

As shown in FIG. 12, the receptacle 65 is, for instance, essentially with a parallelepipedic shape open on a face. This receptacle 65 comprises a cavity 66 in which a pellet 67 can be inserted. This cavity 66 is adapted to let water flow around the pellet 67 and to allow collecting the detergent product diluted in the water so that it drains toward the low outlet 55.

Of course, the receptacle 65 can be used in combination with any of the other features of the invention as well as independently of those.

In other variants, a plurality of fans 12 and a plurality of burners 11 are disposed on the same wall.

Figure 13:
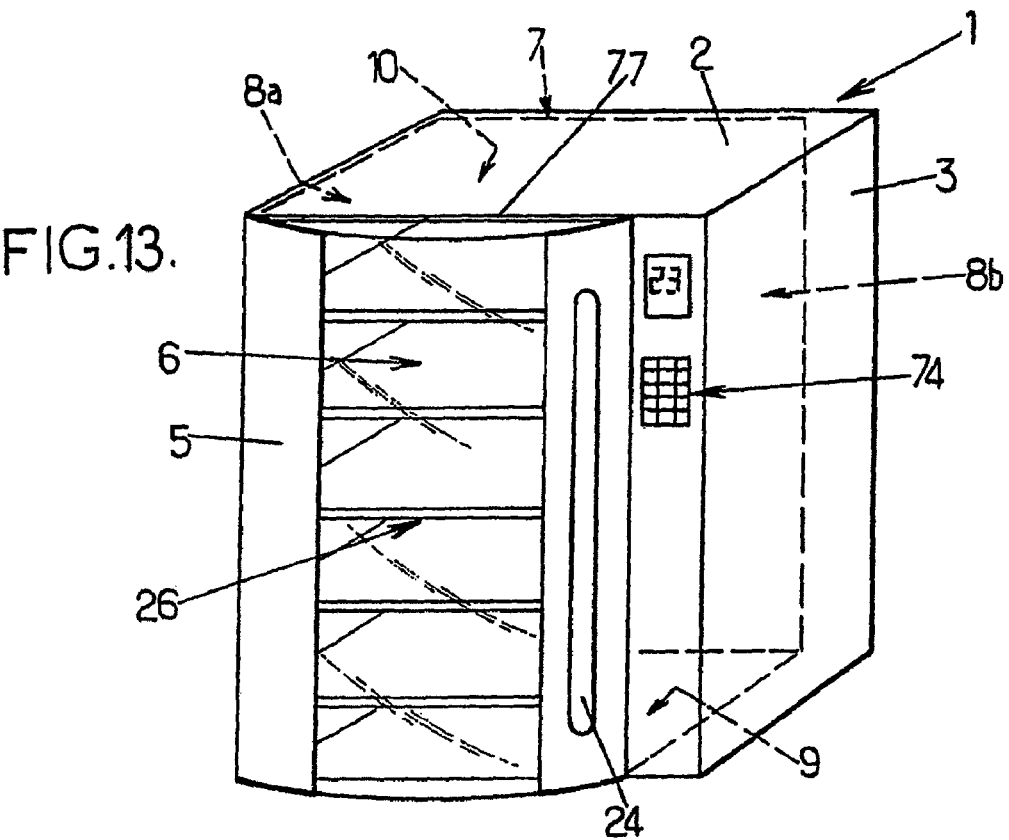
FIG. 13 is a schematic view in perspective of a variant of the oven according to the invention.
Figure 14:
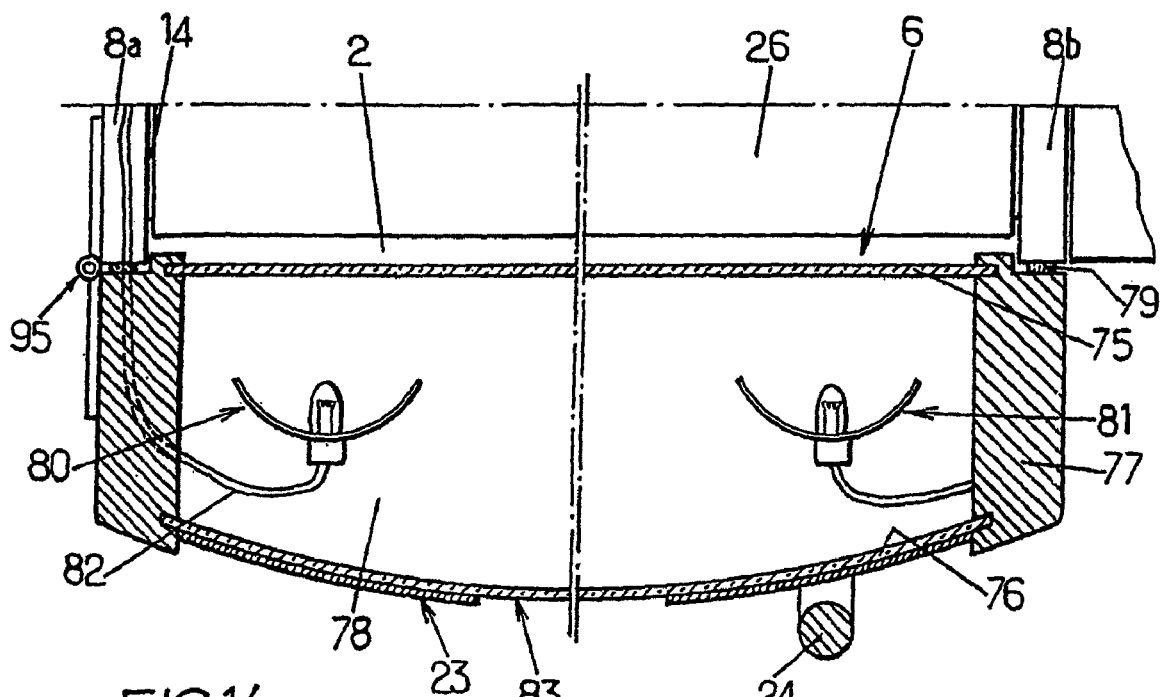
FIG. 14 is a schematic view partially in section of the oven door shown in FIG. 13.
Figure 15:
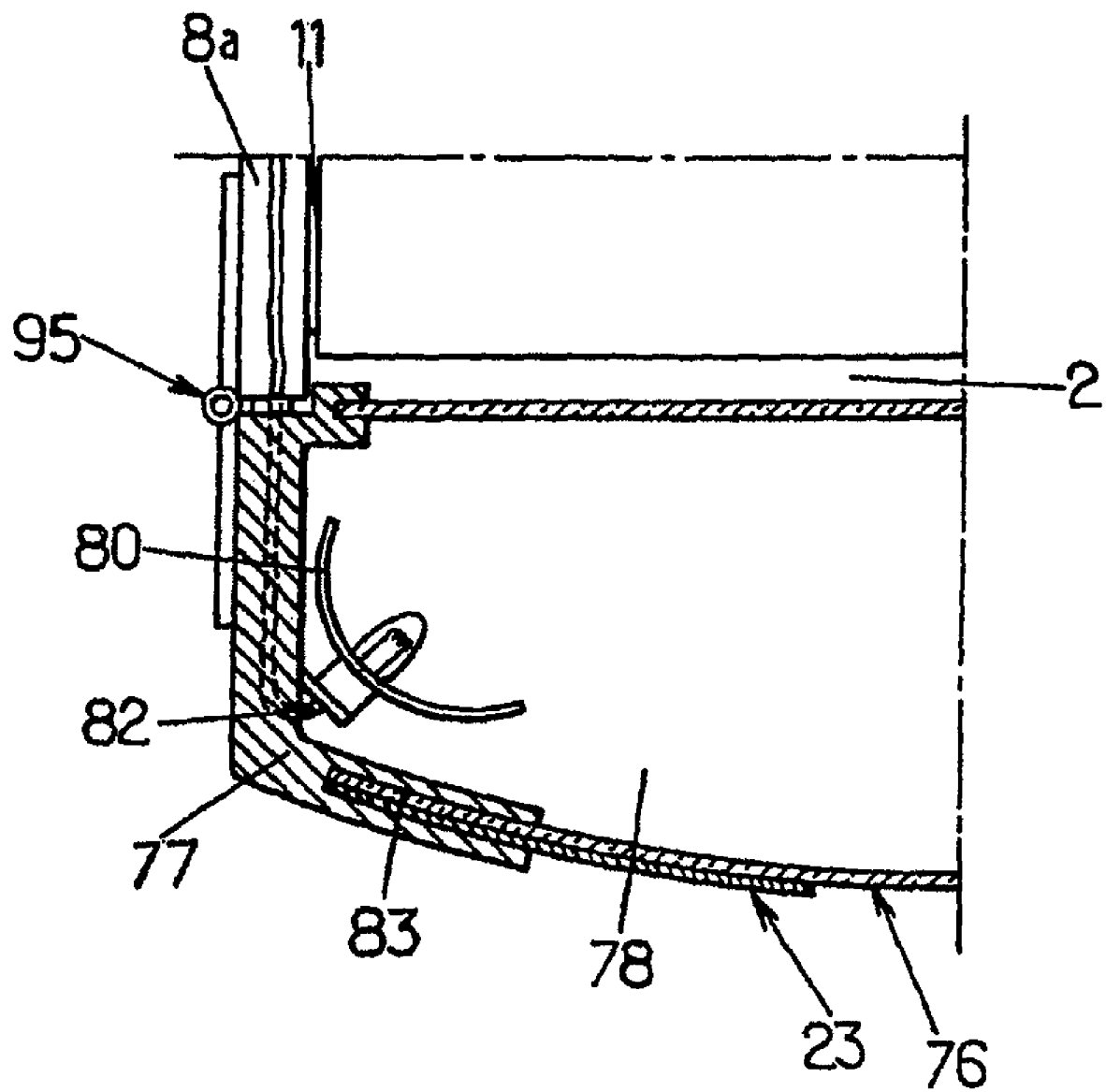
FIG. 15 illustrates, in a view alike FIG. 14, an alternative of the oven shown in FIGS. 13 and 14.

In another variant, shown in FIGS. 13 to 15, the oven according to the invention differs essentially from the previous embodiments and variants by the fact that it comprises means for signalling the end of a heating process.

As shown on FIG. 13, the oven 1 comprises an enclosure 2 contained in a casing 3. This casing 3 carries regulating means 74. The regulating means 74 comprise means for regulating the temperature, and possibly the degree of moisture in enclosure 2, as well as means generating an acoustic signal to indicate the end of a heating process. The regulating means 74 also control illuminating means 80, 81.

The enclosure 2 is closed by a door 5 intended for inserting the food to be heated and/or cooked in said enclosure 2.

The oven 2 can be an electrical or gas-fired oven, with in both cases, heating means as above described.

The enclosure 2 comprises supports, such as slideways 14 (see FIG. 14) for trays 26 receiving the food to be heated and/or cooked in the oven 1.

As shown on FIG. 14, door 5 is a double-walled door. It comprises two glazed panels 75, 76, an inner panel 75 and an outer panel 76.

The inner panel 75 closes the front face 6. It is at least partially transparent. The region of the inner panel 75 facing the front side 6 is thoroughly even and smooth.

The outer panel 16 makes up the front face of the oven 1. It is possibly convex around a vertical axis.

The inner 75 and outer 76 panels are maintained together encased in a frame 77. The frame 77 extends over part of the periphery of the inner 75 and outer 76 panels and maintains them spaced apart to define an insulating space 78. The insulating space 78 at least partially thermally insulates the enclosure 2 from the surroundings in which the oven 1 is located. A seal 79 provides for the tightness between the side walls 8a, 8b and the inner panel 75.

The door 5 is mounted rotatively, on one 8a of the side walls 8a, 8b, around a vertical axis by means of hinges 95.

The illuminating means 80, 81 are mounted in the insulating space 78. The illuminating means 80, 81 are for example made up of two vertical rows of lamps. These lamps are distributed heightwise for example in such a way that each lamp is located so as to correspond to a space of the enclosure 2 limited by two consecutive trays 26 or between one of these trays 26 and the bottom 9 or the top 10.

According to an alternative shown on FIG. 15, the illuminating means 80 are mounted in the frame 77.

The illuminating means 80 can also be mounted on one side only of the oven 1.

According to other alternatives of the invention, a lamp can illuminate several levels. For example, in an oven 1 with ten trays 26, three lamps distributed across the height can prove sufficient.

The illuminating means 80, 81 are supplied in power by a wiring 82 running within frame 77 and crossing one 8a of the side walls 8a, 8b.

The outer panel 76 comprises a transparent region 83 facing a transparent region of the inner panel 75 to form a window making it possible to see into the inside of the enclosure 2. The outer panel 76 comprises an opaque area 84; this opaque area 84 can mask the illuminating means 80, 81 when they are mounted in the insulating space 78. However, even when the illuminating means 80, 81 are mounted in the frame 77, the outer panel 76 can comprise an opaque area 84. This opaque area 84 is for example made up of two coating strips 85 that are screen printed on one of the faces of the outer panel 76. A handle 86 is provided on the door 5 to open it.

At the end of a predetermined heating process, the control means 74 trigger the flashing of the illuminating means 80, 81.

In another variant, shown in FIGS. 16 to 19, the oven according to the invention differs essentially from the previous embodiments and variants by the fact that it comprises means for braking and/or driving and/or reversing the rotation of the fan 12.

Figure 16:
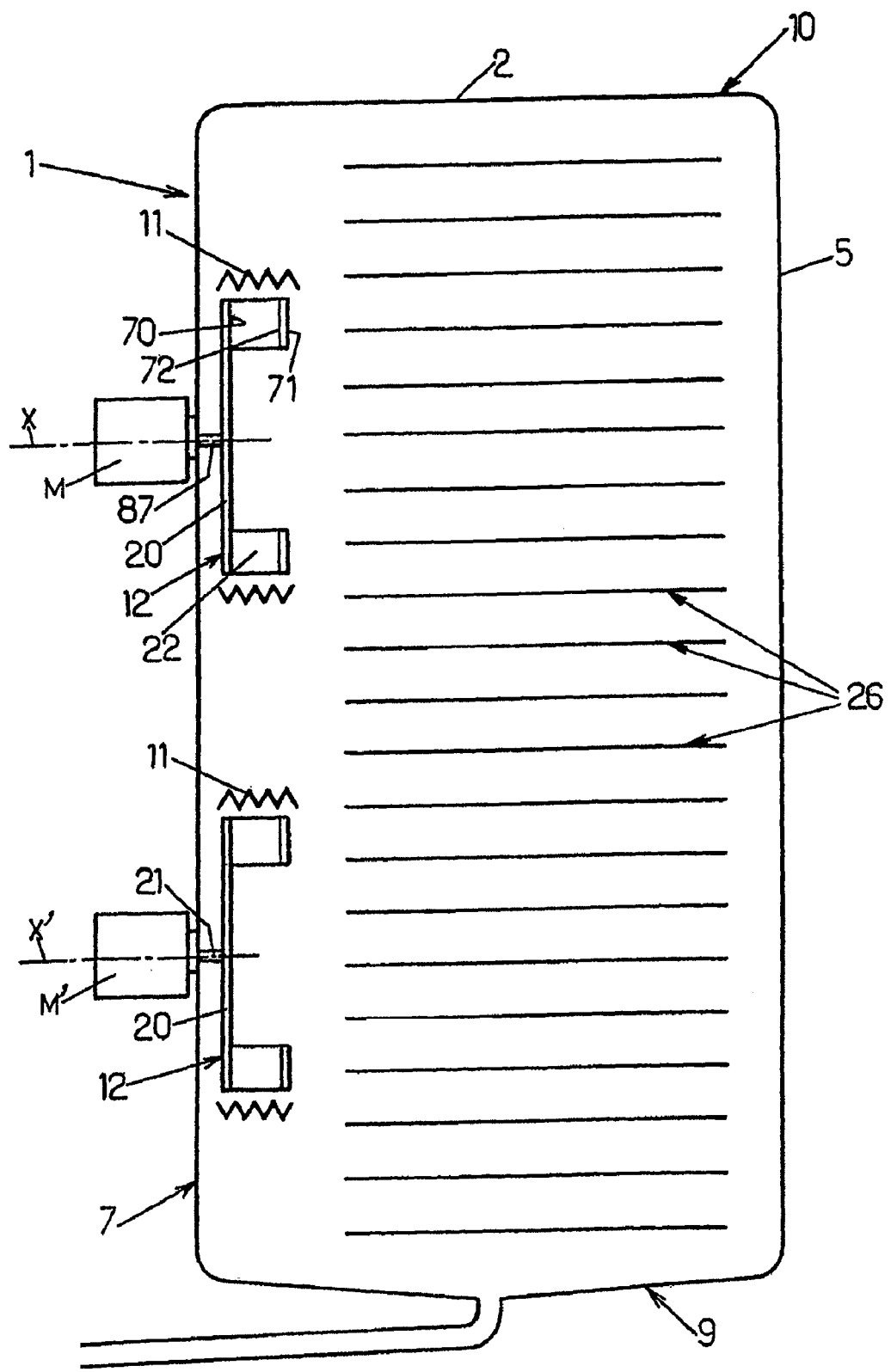
FIG. 16 shows schematically in section, in a vertical plane normal to the bottom wall and intersecting this bottom wall substantially in the middle, an embodiment of the oven in compliance with the present invention.

According to this variant, shown on FIG. 16, the oven 1 according to the invention comprises an enclosure 2 (or muffle), closed by a door 5 intended for the introduction of food to be heated and/or cooked in enclosure 2.

Enclosure 2 has a substantially parallelepiped shape with a back wall 7, opposed to door 5, two vertical side walls, a bottom wall 9 and a top wall 10.

The side walls are adapted to receive twenty trays 26 on which food to be heated and/or cooked can be accommodated.

On its back wall 7, the oven 1 incorporates two heating devices 11, respectively circular around horizontal axes X and X' that are normal to the back wall 7. The heating devices 11 incorporate, in the embodiment presented herewith, electrical resistors.

Two fans 12 are mounted to be rotating each respectively around the axes X and X'. Each fan 12 consists of a disk 20 centred on one of the axes X and X'. On the periphery of the disk 20, each fan 12 comprises a plurality of blades 22 regularly and angularly distributed around one of the axes X and X'. These blades 22 are for example made up of plane rectangular strips or lamellae extending in a plane that is substantially perpendicular to the disk 20 and going through the axes X and X'. This symmetry in relation to one axis X or X' enables the blades 22 to rotate clockwise and anti-clockwise in an equivalent manner.

Each blade 22 is connected on the one hand, with the disk 20 by a first edge 70 and, on the other hand, with a crown 71 by a second edge 72. The crown 71 is circular, with an outside diameter that is substantially equal to the one of disk 20. It is centred on the corresponding axis X or X'. It extends in a plane parallel to disk 20.

The disk 20 has a diameter that is substantially smaller than the one of the circle on which each heating 8 extends.

Each fan 12 is driven by a motor M or M' through a shaft 87 extending according to axis X or X'.

Each motor M or M', is for example a one-phased motor with four poles with a power of 250 Watts.

Figure 17:
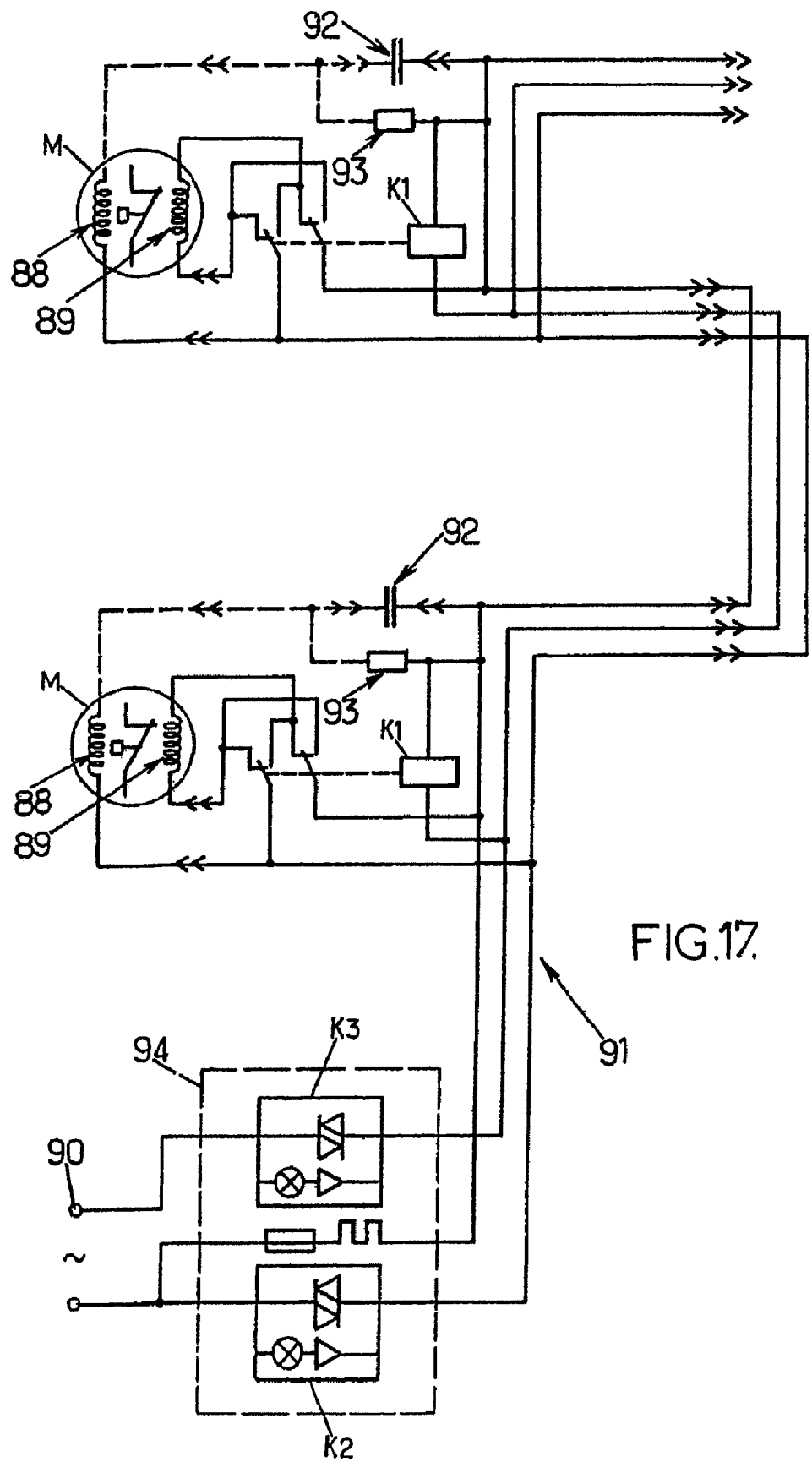
FIG. 17 shows schematically an embodiment of an electrical power circuit of the motors driving the oven fans as shown on FIG. 16.

As shown on FIG. 17, each motor M or M' comprises a main winding 78 and a secondary winding 89.

The motors M and M' are supplied with alternating current from a current source 90 via a supply circuit 91.

Condensers 92 make it possible to shift the phase of the secondary windings 89 in relation to the one-phased motors M and M'. For 250-watt motors, their value amounts for example to ten microfarads or so. Resistors 93 unload the condensers 92 after the power supply of the motors M and M' has been cut off for the purpose of a maintenance operation if need be. These resistors 93 reach for example 470 kilo-ohms.

Each motor M or M' is controlled by first K1, second K2 and third K3 switching means. The first switching means K1 consist for example of an electromechanical relay. They make it possible to reverse the direction of current in the main winding 88 in relation to the direction of current in the secondary winding 89.

The second switching means K2 consist for example of an electronic relay power relay interposed in the supply circuit 91 of the motors M and M'. This relay is of the so-called asynchronous type.

The third switching means K3 consist for example of a relay. This relay serves as interface for the supply circuit 91 of motors M and M' with the control electronics (not shown). This relay controls the first switching means K1 of each motor M or M'.

The second K2 and third K3 switching means are mounted for example on a relay card 94.

The second switching means K2 are actuated by control electronics from the voltage zero (point Z on FIG. 18 which shows the positive P and negative N alternations of the sine wave current injected into the supply circuit 91 of the motors M and M'). The voltage zero Z is detected by the control electronics.

The control electronics actuate the second switching means K2, from the voltage zero Z, to connect the motors M and M' with the current source 90 only during the positive alternations P and even only part of these alternations P (hatched areas on FIG. 18) with a view of graduating the power required for exerting a braking action on the motors M and M'. In this manner, the current used for feeding the motors M and M' during the braking phases (referred to as F on FIG. 19) is a rectified current. Thanks to this aspect of the present invention, the use of a rectifying bridge can thus be spared.

Reciprocally, in order to feed the motors M and M', during the driving phases E of the motors M and M', the second switching means K2 can be actuated by the control electronics, still from the voltage zero Z, in order to connect the motors M and M' to the current source 90 during all of the positive alternations P and at least part of the negative alternations N, this with a view of graduating the speed of the motors M and M'.

In order to achieve a better braking efficiency, prior to injecting the rectified current with the help of the second switching means K2, the direction of rotation of the motors M and M' can be reversed. This inversion is carried out by reversing the direction of current in the main winding 88 in relation to the secondary winding 89 of the motors M and M' via the first switching means K1.

In order to prevent the motors M and M' from starting up again following a braking action, without having changed the direction of rotation, the second switching means K2 are reset during a resting phase R, for example for 2 seconds, at the end of the braking phases F and before the driving phases E during which the motors M and M' are started up again at the desired speed.

FIG. 19 shows a cycle of operation of the first K1 and second K2 switching means.

The first switching means K1 can assume two configurations symbolized by the states 0 and 1 on the upper curve of FIG. 19. State 0 corresponds to the clockwise direction and state 1 to the anti-clockwise direction.

On the lower curve of FIG. 19, state 0 represents the state in which the second switching means K2 disconnect the motors M and M' from the current source 90 and state 1, the state in which the second switching means K2 connect the motors M and M' to the current source 90 during the whole of each period T of the cycle of alternating current feeding these motors M and M'. An intermediate state between states 0 and 1 corresponds to the braking phases F. As indicated above, this state is reached by connecting motors M and M' to the current source 90 only during part of the positive alternations P via the second switching means K2. This state can assume any value between 0 and 1 in such a way to graduate the power supplied to the motors M and M' during the braking phases F.

It proves of course equivalent to consider the positive alternations or the negative alternations reciprocally. Thus, when it is written for example that the second switching means K2 disconnect the motors M and M' from the current source 90 during part of the positive alternations P, it might as well been written that the second switching means K2 disconnect the motors from the current source 90 during part of the negative alternations N and so forth.

Of course, any feature of one of the variants or embodiments can be combined with one or several others without going beyond the scope of the invention.

The invention claimed is:

1. An oven for cooking food, comprising:
   an enclosure for receiving the food to be heated and for containing a cooking atmosphere, the enclosure comprising bottom wall and a top wall, interconnected by at least two upright side walls, the enclosure being closed by at least one upright door, and communicating with the outside by way of an evacuation aperture for gases under positive pressure in the enclosure,
   a first temperature probe to measure the temperature of the gases issuing from the evacuation aperture;
   a second temperature probe, external of the enclosure, to measure a reference temperature; and
   a control for calculating humidity rates in the oven as a function of temperature measured at the first and second temperature probes.

2. The oven according to claim 1, comprising:
   a heater for heating the cooking atmosphere,
   a fan, located in the interior of the enclosure, to stir the cooking atmosphere heated by the heater, this fan creating an area of low pressure in the enclosure, and
   an air inlet opening in the enclosure, approximately in said low-pressure area of the fan.

3. The oven according to claim 2, comprising a regulation chamber, at least partially filled with a liquid of which the volume is adjusted so as to vary between a high level and a low level, this regulation chamber communicating with the air inlet.

4. The oven according to claim 3, comprising an air admission duct which extends between a high end and a low end, the high end opening outside the regulation chamber and the enclosure, and the low end being covered by the liquid when the level of the liquid corresponds approximately to its high level.

5. The oven according to claim 3, comprising an evacuation chamber, at least partially filled with a liquid of volume adapted to vary between the high level and the low level, the evacuation chamber communicating with the regulation chamber during oven cooking operations.

6. The oven according to claim 5, comprising a regulator box, containing both the regulation chamber and the evacuation chamber, these two chambers constituting volumes which are at least partially separated from one another, communicating between one another by means of a narrow passage, adapted to allow liquid to flow between these two chambers.

7. The oven according to claim 5, comprising an evacuation tube extending between the evacuation aperture and a high end, opening into the evacuation chamber above the high and low levels of the liquid.

8. The oven according to claim 7, comprising a chimney extending between a first end communicating with the outside of the evacuation chamber and a second end coming over the high level of the liquid, the second end allowing the gases under positive pressure in the enclosure to escape via the evacuation tube.

9. The oven according to claim 6, wherein the second temperature probe is located beneath the low level of liquid in the regulator box.

10. The oven according to claim 5, wherein the first temperature probe is located above the high level of liquid in the evacuation chamber.

11. The oven according to claim 1, comprising means for the production of steam, arranged to supply steam in the enclosure.

12. The oven according to claim 1 wherein the first temperature probe is located within an evacuation chamber filled at least partially with liquid, the evacuation chamber receiving gases issuing from the evacuation aperture.

13. The oven according to claim 12 wherein the second temperature probe is located within a regulation chamber filled at least partially with liquid.

14. The oven according to claim 13 wherein the evacuation chamber and regulation chamber communicate with each other via at least one passage.

15. The oven according to claim 1 wherein both the first temperature probe and the second temperature probe are located within an evacuation chamber filled at least partially with liquid, the evacuation chamber receiving gases issuing from the evacuation aperture.

16. The oven of claim 15 wherein the first temperature probe is above a liquid level of the evacuation chamber and the second temperature probe is below the liquid level.

* * * * *